(12) United States Patent
Karube et al.

(10) Patent No.: US 7,757,799 B2
(45) Date of Patent: Jul. 20, 2010

(54) SADDLE RIDE VEHICLE

(75) Inventors: Shinichi Karube, Saitama (JP); Rei Shioya, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 181 days.

(21) Appl. No.: 12/010,072

(22) Filed: Jan. 18, 2008

(65) Prior Publication Data
US 2008/0115991 A1  May 22, 2008

Related U.S. Application Data

(63) Continuation of application No. 11/218,487, filed on Sep. 6, 2005, now Pat. No. 7,448,664.

(30) Foreign Application Priority Data

| Sep. 6, 2004 | (JP) | 2004-258978 |
| Sep. 6, 2004 | (JP) | 2004-258991 |
| Sep. 6, 2004 | (JP) | 2004-258996 |

(51) Int. Cl.
B62D 25/20 (2006.01)

(52) U.S. Cl. .................................. 180/90.6

(58) Field of Classification Search ............ 74/560; 180/90.6, 220, 291; 296/75; 280/163
See application file for complete search history.

(56) References Cited

U.S. PATENT DOCUMENTS

| 4,095,820 | A | | 6/1978 | Hanagan |
| 4,174,852 | A | * | 11/1979 | Panzica et al. ........... 280/291 |
| 4,413,700 | A | | 11/1983 | Shiratsuchi et al. |
| 4,457,524 | A | | 7/1984 | Yoshiwara et al. |
| 4,673,212 | A | | 6/1987 | Mayer |
| 5,553,783 | A | | 9/1996 | Slavas et al. |
| 5,560,445 | A | | 10/1996 | Saito et al. |
| 5,893,424 | A | * | 4/1999 | Hisada ..................... 280/291 |
| 6,070,896 | A | | 6/2000 | Saiki et al. |
| 6,113,121 | A | * | 9/2000 | Mizuta ..................... 280/163 |
| 6,116,630 | A | * | 9/2000 | Thomas .................... 280/291 |
| 6,224,134 | B1 | * | 5/2001 | Johnson et al. ............ 296/75 |
| 6,270,106 | B1 | * | 8/2001 | Maki et al. ................ 280/291 |
| 6,302,488 | B1 | | 10/2001 | Tanigaki et al. |
| 6,318,743 | B1 | | 11/2001 | Nakashima et al. |

(Continued)

FOREIGN PATENT DOCUMENTS

JP 3-31620 B2 5/1991

(Continued)

Primary Examiner—Paul N Dickson
Assistant Examiner—Robert A Coker
(74) Attorney, Agent, or Firm—Birch, Stewart, Kolasch & Birch, LLP

(57) ABSTRACT

A saddle ride vehicle with a front and a rear wheel, a front fender covering from an upper side to a rear side of the front wheel, and a rear fender covering from a front side to an upper side of the rear wheel. A rider of the vehicle places his feet on right and left foot rests. Right and left foot boards are provided under the rider's feet for connecting the front fender and the rear fender to each other, and right and left foot brackets are provided corresponding to the right and left foot rests. Each of the foot boards is clamped between one of the foot rests and the corresponding one of the foot brackets.

20 Claims, 16 Drawing Sheets

U.S. PATENT DOCUMENTS

| | | |
|---|---|---|
| 6,354,476 B1 | 3/2002 | Alderman |
| 6,502,863 B1 * | 1/2003 | Takahashi et al. ........... 280/291 |
| 6,547,027 B1 | 4/2003 | Kalhok et al. |
| 6,645,408 B2 | 11/2003 | Weder |
| 6,648,408 B1 | 11/2003 | Grove |
| 6,719,316 B1 * | 4/2004 | Anthony .................... 280/291 |
| 6,755,269 B1 * | 6/2004 | Davis et al. ................. 280/291 |
| 6,889,789 B2 | 5/2005 | Kurayoshi et al. |
| 6,913,099 B2 | 7/2005 | Scott |
| 6,971,714 B1 | 12/2005 | Hanagan |
| 7,028,800 B2 | 4/2006 | Yagisawa et al. |
| 7,093,684 B2 | 8/2006 | Scott |
| 7,097,188 B2 * | 8/2006 | Takeshima et al. .......... 280/163 |
| 7,111,903 B1 | 9/2006 | Snelson |
| 7,147,281 B2 | 12/2006 | Michisaka et al. |
| 7,175,220 B2 | 2/2007 | Kashiwagi et al. |
| 7,198,129 B2 | 4/2007 | Sakaki et al. |
| 7,219,939 B2 | 5/2007 | Kamemizu et al. |
| 7,234,559 B2 | 6/2007 | Nakano et al. |
| 2003/0205919 A1 | 11/2003 | Hanagan |
| 2005/0012300 A1 * | 1/2005 | Egan ......................... 280/291 |
| 2005/0017531 A1 | 1/2005 | Nagashii |
| 2005/0241547 A1 * | 11/2005 | Colano .................... 108/50.14 |

FOREIGN PATENT DOCUMENTS

| | | |
|---|---|---|
| JP | 11-165679 A | 6/1999 |
| JP | 2001-001975 A | 1/2001 |

\* cited by examiner

SADDLE RIDE VEHICLE

CROSS-REFERENCE TO RELATED APPLICATION

This application is a Continuation of application Ser. No. 11/218,487 filed on Sep. 6, 2005, now U.S. Pat. No. 7,448,664, and for which claims priority under 35 U.S.C. §119 to Japanese Patent Application Nos. 2004-258991, 2004-258978, and 2004-258996, each of which was filed on Sep. 6, 2004, the entire contents of which are hereby incorporated by reference.

BACKGROUND OF THE INVENTION

1. Field of the Invention

The present invention relates to a foot rest structure for a saddle ride vehicle.

2. Description of Background Art

As a seat mount structure for a saddle ride vehicle in the related art, there is known a seat mount structure in which a seat is locked to a vehicle body frame by locking members, and the load is received by a plurality of elastic bodies or brackets (see, for example, Japanese Patent Publication No. Hei 3-31620).

Japanese Patent Publication No. Hei 3-31620 will be described below. Incidentally, the symbols described in the publication are used as they are.

As shown in FIGS. 2 and 3 of Japanese Patent Publication No. Hei 3-31620, a main frame 12 is provided with support brackets 12a and 12c, while a seat 30 is provided at its seat bottom plate 31 with a lock piece 34, a lock hook 35 and a plurality of damper sheets 36, the lock piece 34 is locked to a lock pin 12b provided on the support bracket 12a, the look hook 35 is locked to a lock arm 12d provided on the support bracket 12c, and the damper sheets 36 are set in contact with the upper surface of the support bracket 12c, whereby the seat 30 is mounted to the main frame 12.

In Japanese Patent Publication No. Hei 3-31620, the position where the lock piece 34 is locked to the support bracket 12a and the position where the seat-side load is received by the support bracket 12c and the damper sheets 36 are spaced from each other. Therefore, for example in the case where the load is not exerted uniformly on portions of the seat 30 and a high load is exerted on the side of one of the damper sheets 36 with the result of a large deflection, the seat 30 is inclined. In this instance, a bending moment is generated at the locking portion between the support bracket 12a and the lock piece 34, so that is may be necessary to secure the rigidity of the support bracket 12a and the lock piece 34 against the bending moment.

As a conventional saddle ride vehicle, particularly a conventional structure around the foot rests, there is known (1) a structure in which a frame is projected to lateral sides from a vehicle body frame to support the foot boards (see, for example, Japanese Patent Laid-open No. Hei 11-165679).

Japanese Patent Laid-open No. Hei 11-165679 will be described below. Incidentally, the symbols used in the publication are used.

Japanese Patent Laid-open No. Hei 11-165679 describes that, as shown in FIGS. 1 and 3 of the publication, front and rear wheels (W) are covered respectively by front fenders (B1) and by rear fenders (B2), foot boards (10A) and (10B) for mounting the rider's feet thereon are mounted between the front fenders (B1) and the rear fenders (B2), and the foot boards (10A) and (10B) are supported by frames (1A) and (1B) mounted to both side portions of a vehicle body frame (F).

The frames (1A) and (1B) are each composed of an outer frame (1a) angular U-shaped in plan view and mounted to a side portion of a main lower member (32) constituting the vehicle body frame F, and a roughly L-shaped reinforcing member (2) mounted to the bottom of the angular U shape of the outer frame (1a).

In Japanese Patent Laid-open No. Hei 11-165679, the frames (1A) and (1B) supporting the foot boards (10A) and (10B) are each composed of the angular U-shaped outer frame (1a) and the reinforcing member (2), so that the foot boards (10A) and (10B) are securely supported by the frames (1A) and (1B), but a reduction in the numbers of component parts of the frames (1A) and (1B) is expected due to the request for reductions in weight and cost and the like.

As a conventional brake device for a saddle ride vehicle, there is known one in which a foot board on which to mount a foot is provided with a hole, and the tip end of a brake pedal is projected from the lower side to the upper side of the foot board through the hole (see, for example, Japanese Patent Laid-open No. 2001-1975, and Japanese Patent No. 3217743).

Japanese Patent Laid-open No. 2001-1975, and Japanese Patent No. 3217743 will be described. The symbols used in the publications will be used.

Japanese Patent Laid-open No. 2001-1975, describes that, as shown in FIGS. 1 and 2 of the publication, a foot board 3 is mounted to a lower tube 1 through a foot rest bracket 2, a brake arm 4 is vertically swingably mounted to the lower tube 1 and on the lower side relative to the foot board 3 through a turning base end 4b, and an upwardly bent portion 4a on the tip end side of the brake arm 4 is projected from the lower side to the upper side through a window hole 7 opened in the foot board 3.

FIGS. 1 and 4 of Japanese Patent No. 3217743 also show a structure in which, like the above-mentioned structure, the tip end of a brake pedal 60A disposed on the lower side of a foot board 10 A is projected upwards through a window hole opened in the foot board 10A.

In Japanese Patent Laid-open No. 2001-1975, since the most portion of the brake arm 4 is disposed on the lower side of the foot board 3, it is necessary to take into account the flying of a stone to the brake arm 4 or adhesion of mud or the like to the brake arm 4. In addition, it is desirable that a step-in portion at the tip end of the brake arm 4 is lower so that it is easier for the rider to take the posture of stepping in the step-in portion.

SUMMARY AND OBJECTS OF THE INVENTION

It is an object of the present invention to improve a seat mount structure for a saddle ride vehicle so as thereby to suppress the bending moment on the locking portion between the vehicle body frame side and the seat side and further to enhance the riding comfort without providing a large number of load-receiving portions.

It is another object of the present invention to provide a structure for supporting foot rests and foot boards of a saddle ride vehicle by which it is possible to reduce the number of component parts, to contrive reductions in weight and cost, and further to keep good support of the foot boards while enhancing the productivity.

It is still another object of the present invention to improve a brake device for a saddle ride vehicle, thereby to prevent collision of stones against a brake pedal or adhesion of mud or the like to the brake pedal, and to enable the rider to step in the brake pedal while assuming an easy posture.

According to a first aspect of the present invention, a seat mount structure for a saddle ride vehicle includes a bracket provided in a vehicle body frame, and a hook provided on a bottom plate of a seat, the hook locked to the bracket to thereby mount the seat to the vehicle body frame, characterized in that an elastic body for receiving a seat-side load is mounted to the bracket so that the elastic body is located on the inner side of the hook when the hook is locked to the bracket.

With the elastic body mounted to the bracket so that the elastic body is located on the inner side of the hook, the locking position and the load-receiving position are made to be substantially the same. This ensures that, even in the case where the load is not exerted uniformly on the portions of the seat, a bending moment is not liable to be generated on the hook.

In addition, since the locking position serves also as a load-receiving position, the new load-receiving position is added to the conventional load-receiving position, so that the number of load-receiving positions can be increased.

According to a second aspect of the present invention the hook is provided at a substantially lowermost position of the bottom plate of the seat.

With the hook provided at the substantially lowermost position of the bottom plate of the seat, a higher load is exerted on the position of locking the bracket by the hook than on other portions, and such a load can therefore be received effectively.

According to a third aspect of the present invention the bracket is provided with a wall portion for restricting the position of the hook, near the vehicle body center in the vehicle width direction.

The wall portion makes it easier to guide the hook to the bracket at the time of locking the hook to the bracket. Besides, after the hook is locked to the bracket, the wall portion prevents the hook from getting out of position.

According to a fourth aspect of the present invention a rear portion of the seat is supported on the vehicle body frame through the elastic body.

With the rear portion of the seat supported on the vehicle body frame through the elastic body, it becomes difficult for vibrations from being transmitted from the vehicle body side to the seat.

According to a fifth aspect of the present invention, a saddle ride vehicle includes: front fenders covering from the upper side to the rear side of front wheels; and rear fenders covering from the front side to the upper side of rear wheels; characterized in that the vehicle includes foot boards connecting the front fenders and the rear fenders to each other and disposed near the rider's feet, and the foot boards are each supported in the state of being clamped between a foot bracket, which includes a first member extended in the vehicle width direction and a second member extended in the vehicle front-rear direction from the tip end of the first member, and a foot rest disposed on the upper side of the foot bracket.

Since the foot bracket is composed of the first member extended in the vehicle width direction and the second member extended in the vehicle front-rear direction from the tip end of the first member, the structure is simple, and a reduction in the number of component parts and reductions in weight and cost can be contrived. Moreover, since the foot boards are each supported in the state of being clamped between the foot bracket and the foot rest, good support of the foot boards can be kept.

According to a sixth aspect of the present invention, the foot bracket satisfies the relationship of $0.5L1<L2<L1$, where $L1$ is the length of the first member, and $L2$ is the length of the second member.

In the case where the length $L2$ of the second member satisfies the relationship of $0.5L1$. $L2$, the proportion of the length $L2$ of the second member based on the front-rear length of the foot board connected to the front fender and the rear fender is reduced, and it becomes easier for the foot board to be deflected. On the other hand, in the case where the length $L2$ of the second member satisfies the relationship of $L2$. $L1$, the second member is so long as to lead to an increase in the weight of the foot bracket. Therefore, with the foot bracket set in the range of $0.5L1<L2<L1$, a reduction in weight and good support of the foot boards can be simultaneously achieved.

According to a seventh aspect of the present invention, the foot rest is mounted in a cantilever mode to a vehicle body frame through the foot bracket.

With the foot rest mounted in a cantilever mode to the vehicle body frame, the support structure for the foot rests is more simplified.

In addition, where the weight of the foot rest is equivalent to the weight of a conventional foot rest, it is possible to enlarge the outer shape of the foot bracket and to support a foot board with a larger area, as compared with the case of the related art.

According to an eighth aspect of the present invention a brake device for a saddle ride vehicle, including, on both lateral sides of the vehicle, foot boards disposed between a front fender and a rear fender, and foot rests provided at upper portions of the foot boards, and a brake pedal stepped in by a foot mounted on the foot board and the foot rest; characterized in that the brake pedal is disposed on the upper side relative to the foot board; the brake pedal includes an arm portion movable vertically, and a pedal portion provided at a tip end portion of the arm portion so as to be stepped in by the foot; and the arm portion includes a bent portion projectedly bent to the vehicle outside in plan view.

According to a ninth aspect of the present invention the tip end portion of the arm portion and the pedal portion are flush with each other in side view.

According to a tenth aspect of the present invention the arm portion and the pedal portion are molded integrally with each other.

According to a eleventh aspect of the present invention a side surface of the brake pedal is located on the inner side of an inner end surface of the foot rest when the brake pedal is stepped in.

According to a twelfth aspect of the present invention, of said foot board, a portion located on the lower side of the tip end of the brake pedal is more sunk than the other portions.

According to the first aspect of the present invention, the locking position where the seat is locked to the vehicle body frame side and the support position where the seat is supported on the vehicle body frame side are substantially the same, so that the generation of a bending moment in the hook located at the lock position can be suppressed, as compared with the case where the seat lock position and the seat support position are different as in the related art.

In addition, since the seat is supported also at the lock position, the number of support positions is increased, so that the load can be dispersed more than in the related art, the bottom plate of the seat can be restrained from being deformed, and the ride comfort can be enhanced. Further, notwithstanding the increase in the number of support positions, the modifications on the bottom plate side and on the vehicle body frame side can be reduced, and an increase in cost can be suppressed.

According to the second aspect of the present invention, the hook is provided at a substantially lowermost portion of the bottom plate of the seat, and the support position for the seat is provided at a portion where a high load is exerted, so that the load can be efficiently received and dispersed, the deformation of the bottom plate of the seat can be restrained more, and the ride comfort can be enhanced more.

According to the third aspect of the present invention, the wall portion makes it possible to securely perform the positioning of the hook at the time of mounting the seat, and to mount the seat easily. In addition, the wall portion can prevent the seat from getting out of position in the vehicle width direction during driving of the vehicle.

According to the fourth aspect of the present invention, the rear portion of the seat is supported on the vehicle body frame through the elastic body, so that vibrations can be prevented from being transferred from the vehicle body side to the seat.

According to the fifth aspect of the present invention, the foot boards can be supported by foot brackets simple in structure, and a reduction in the number of component parts and reductions in weight and cost can be contrived.

In addition, since the first member and the second member constituting the foot bracket are simple in shape, productivity can be enhanced.

Further, the good support of the foot board by clamping it between the foot bracket and the foot rest ensures that it is unnecessary to particularly use a reinforcing member, which also contributes to the reductions in weight and cost.

According to the sixth aspect of the present invention, the length L1 of the first member and the length L2 of the second member satisfy the relationship of $0.5L1<L2<L1$, the foot brackets are light in weight, so that the foot boards are not liable to be deflected, and a reduction in weight and good support of the foot boards can be simultaneously achieved.

According to the seventh aspect of the present invention, the foot rest is supported in a cantilever mode, so that the support structure for the foot rest can be more simplified, and a reduction in weight can be contrived.

In addition, where the weight of the foot rest is equivalent to that in the related art, for example, the outer shape of the foot bracket can be enlarged, the area of the foot board can also be enlarged, the foot positions can be enlarged at the times of riding on and getting off the vehicle, it becomes easier to ride on and getting off the vehicle, and the spaces near the feet during driving are broadened, which promises an easy riding posture.

According to the eighth aspect of the present invention, the brake pedal is disposed on the upper side relative to the foot board, so that it is possible to prevent collision of stones against the brake pedal and adhesion of mud or the like to the brake pedal.

In addition, with the brake pedal including the arm portion and the pedal portion and with the arm portion including the bent portion projectedly bent to the vehicle outside in plan view, it becomes easy to step in the pedal portion, and erroneous stepping in of the arm portion can be prevented.

According to the ninth aspect of the present invention, the tip end portion of the arm portion and the pedal portion are substantially flush with each other in side view, so that the pedal portion can be easily formed, and the cost can be reduced.

According to the tenth aspect of the present invention, the arm portion and the pedal portion are molded integrally, so that the number of component parts can be reduced, and the cost can be reduced. Besides, the brake pedal can be made in a simple shape, and appearance quality can be enhanced.

According to the eleventh aspect of the present invention, the side surface of the brake pedal is located on the inner side of the inner end surface of the foot rest when the brake pedal is stepped in, so that the movable range of the brake pedal can be set on a lower side without largely bending the brake pedal, and the rider can step in the brake pedal while assuming an easy posture.

According to the twelfth aspect of the present invention, of the foot board, a portion located on the lower side of the tip end of the brake pedal is more sunken than the other portions, so that the movable range of the brake pedal can be enlarged, and the degree of freedom in designing the brake device can be increased.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A best mode for carrying out the present invention will be described below, based on the accompanying drawings.

Figure 1:
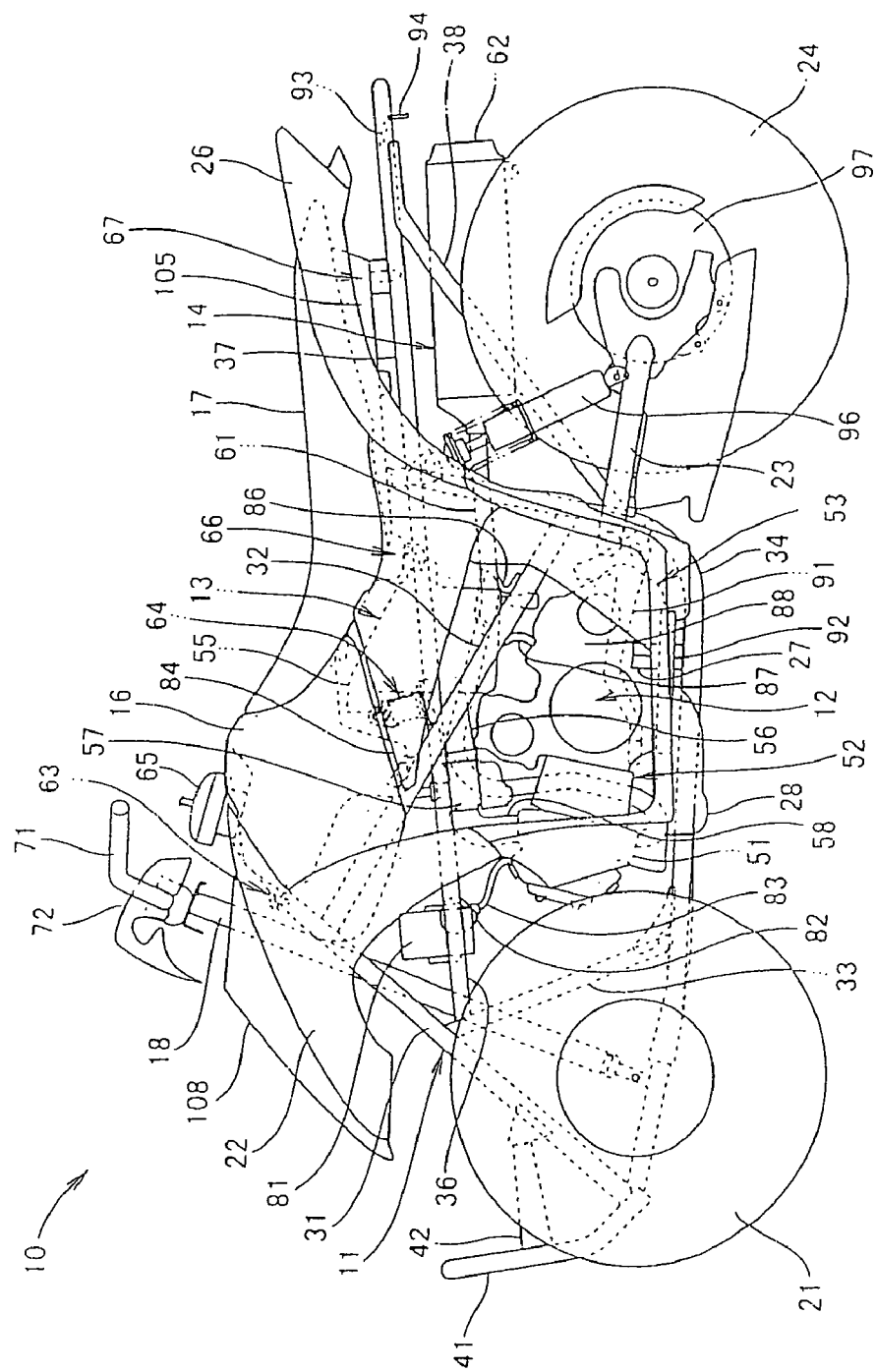
FIG. 1 is a side view of a saddle ride vehicle in which a seat mount structure according to the present invention is adopted.

FIG. 1 is a side view of a saddle ride vehicle in which a seat mount structure according to the present invention is adopted. The saddle ride vehicle 10 is a small-type buggy including a vehicle body frame 11 serving as a skeleton, a power unit 12 disposed on the inside of a lower portion of the vehicle body frame 11, an intake device 13 and an exhaust device 14 which are connected to the power unit 12. Also included are a fuel tank 16 and a seat 17 which are mounted to upper portions of the vehicle body frame 11, left and right front wheels 21 steerably mounted to front portions of the vehicle body frame 11 through a steering shaft 18, left and right fenders 22 covering the upper side and the rear side of the front wheels 21 respectively, left and right rear wheels 24 vertically movably mounted to lower rear portions of the vehicle body frame 11 through a swing arm 23, left and right rear fenders 26 covering the front side and the upper side of the rear wheels 24 respectively, and left and right foot boards 28 connecting between the front fenders 22 and the rear fenders 26 and supporting thereon foot rests 27 for the driver.

The vehicle body frame 11 includes left-right pairs of frame components having, on each side, a front frame 31 so inclined as to have its upper end on the rear side of its lower end, an upper inclined frame 32 and a lower inclined frame 33 which are extended rearwardly downwards from an intermediate portion of the front frame 31, a lower main frame 34 connected to the lower end of the front frame 31 and the rear ends of the upper inclined frame 32 and the lower inclined frame 33 and having a rear portion raised. An upper front frame 36 connects between the upper inclined frame 32 and the lower inclined frame 33 while extending somewhat rearwardly upwards, an upper rear frame 37 extends somewhat rearwardly upwards from an intermediate portion of the upper inclined frame 32 and having an intermediate portion connected to the rear end of the lower main frame 34. A rear inclined frame 38 is disposed bridgingly between the lower main frame 34 and the upper rear frame 37, the left-right pairs being connected through a plurality of cross members (not shown). Incidentally, symbol 41 denotes a front bumper frame, and 42 denotes a bumper support frame.

The power unit 12 is composed of an engine 52 having the intake device 13 and the exhaust device 14 connected to a cylinder head 51, and a transmission 53 provided to be integral with the engine 52.

The intake device 13 is composed of an air cleaner 55 for cleaning the intake air, a connecting tube 56 attached to a front portion of the air cleaner 55, a carburetor 57 connected to the front end of the connecting tube 56, and an intake pipe 58 connected to a front portion of the carburetor 57 and to the cylinder head 51.

The exhaust device 14 is composed of an exhaust pipe 61 extended upwards from the cylinder head 51 and then rearwards, and a muffler 62 connected to the rear end of the exhaust pipe 61.

The fuel tank 16 is a resin-made container having a front portion mounted to the front frame 31 side through a front portion mount portion 63, and having a bottom portion mounted to the upper rear frame 37 through a left-right pair of bottom portion mount portions 64. Incidentally, symbol 65 denotes a cap for closing a fuel supply port.

The seat 17 is a member detachably attached to the upper rear frame 37. The seat 17 is locked to and elastically supported on the upper rear frame 37 side by a left-right pair of front portion lock portions, and is positioned to and elastically supported on the upper rear frame 37 side by a left-right pair of rear portion positioning portions 67.

The steering shaft 18 has its upper portion rotatably supported on the front frame 31 side, and has its lower portion rotatably supported on the lower main frame 34 side, with a bar handle 71 mounted to the upper end of the steering shaft 18. Incidentally, symbol 72 denotes a steering handle cover.

Also shown are a CDI unit 81, an ignition coil 82, a high-tension cord 83, a side cover 84 molded integrally with the rear fender 26, a guard member 86 mounted to the upper inclined frame 32 for covering the right side in the vehicle width direction (the depth side of the paper surface) of the exhaust pipe 61, and a blow-by hose 87 for recirculating a blow-by gas from the inside of a crankcase 88 of the power unit 12 to the air cleaner 55.

In addition, a brake pedal 91 is disposed on the right side in the vehicle width direction of the vehicle body frame 11, left and right foot brackets 92 are attached respectively to the left and right lower main frames 34 for supporting the left and right foot boards 28, a pole stay 93 is attached to a rear end portion of the upper rear frame 37 for erecting a pole, a reflector 94 is attached to a lower portion of the pole stay 93. Also shown are a rear cushion unit 96, a drum brake 97 mounted to the rear end of the swing arm 23 for braking the rear wheel 24.

Figure 2:
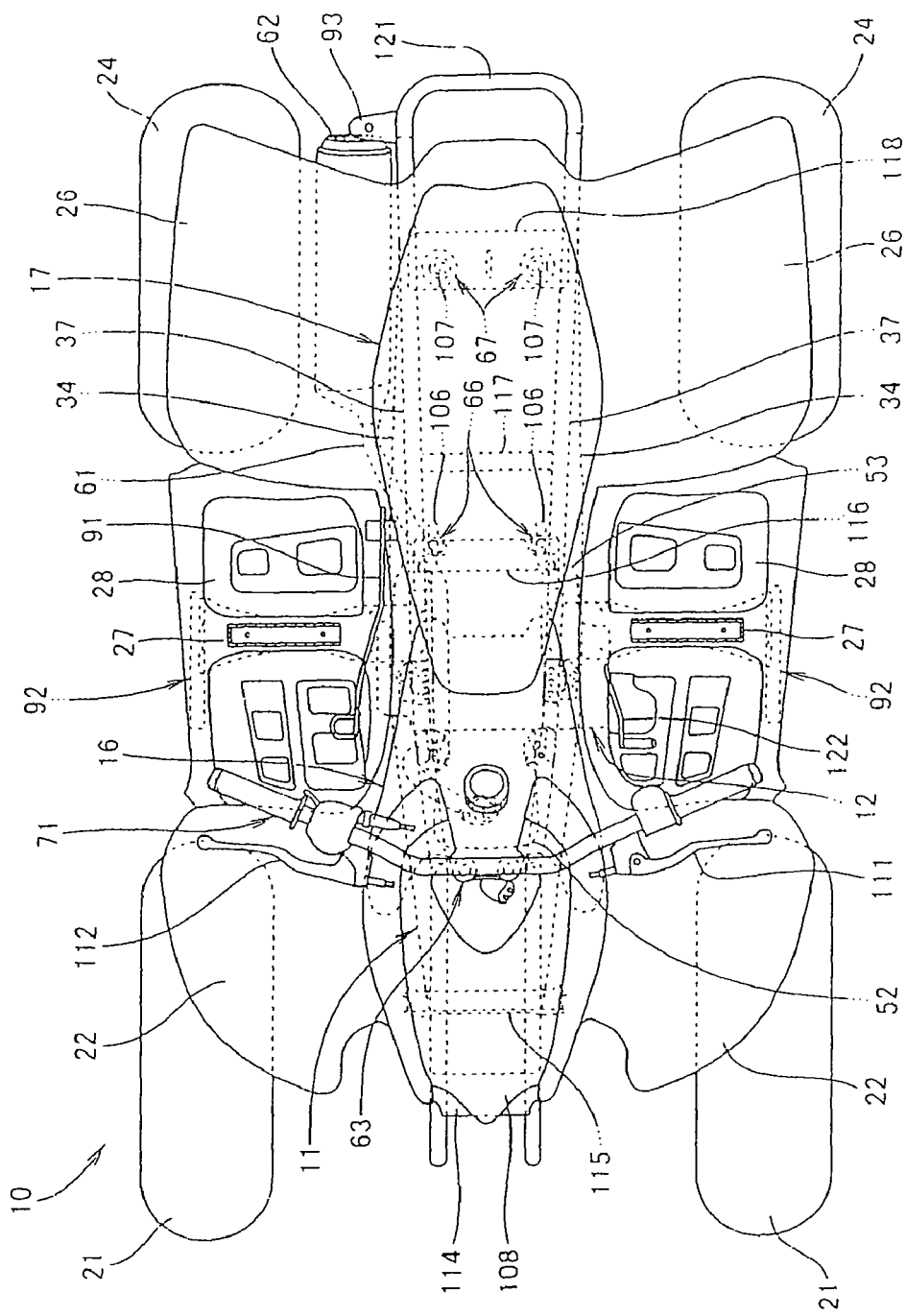
FIG. 2 is a plan view of the saddle ride vehicle according to the present invention.

FIG. 2 is a plan view of the saddle ride vehicle according to the present invention, in which the fuel tank 16 has its front portion wider than its rear portion in plan view, and is provided with a front portion mount portion 63 at the center of the front portion thereof.

The seat 17 is provided on its bottom plate 105 (see FIG. 1) with left and right hooks 106, 106 constituting the front portion lock portions 66, and with left and right positioning projections 107, 107 constituting the rear portion positioning portions 67.

The left and right front fenders 22, 22 are integrally provided with a front cover 108 at a central portion thereof.

The foot rests 27 are members attached, through the foot boards 28, to the foot brackets 92 provided on the left and right sides and being roughly L-shaped, and are portions on which to mount the driver's feet.

The bar handle 71 is provided at its left front portion with a rear brake lever 111 for operating the drum brakes 97 (see FIG. 1) on the rear wheel side, and is provided at its right front portion with a front brake lever 112 for operating disk brakes (not shown) on the front wheel side. Namely, the rear wheel drum brakes 97 can be operated both by the brake pedal 91 and by the rear brake lever 111.

In the figure, symbols 114 to 118 denote the cross members provided in the vehicle body frame 11, symbol 121 denotes a U-shaped cross pipe connected to the rear ends of the left and right upper rear frames 37, and symbol 122 denotes a transmission change pedal.

Figure 3:
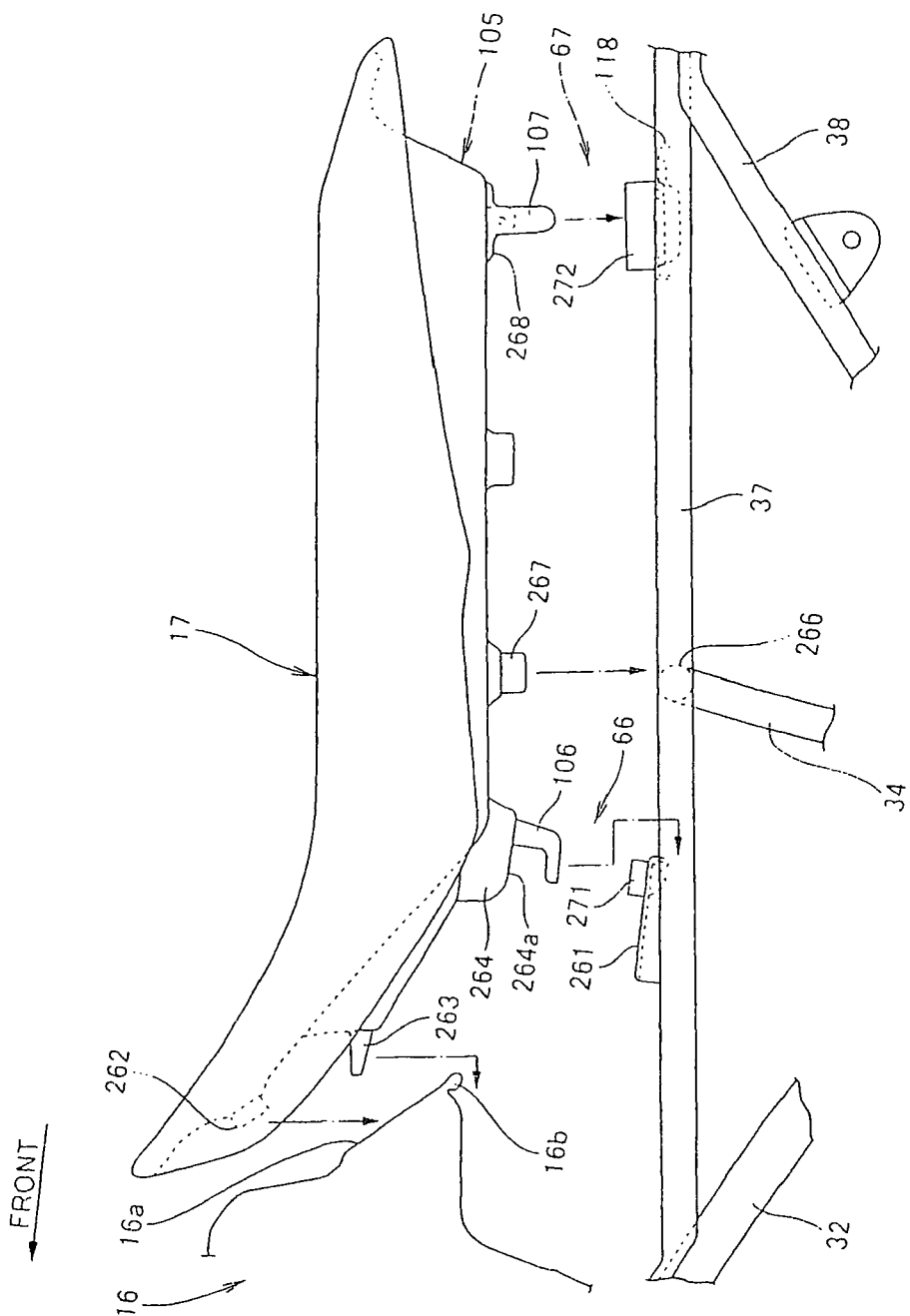
FIG. 3 is a side view of a major part for illustrating the seat mount structure according to the present invention.

FIG. 3 is a side view (arrow (FRONT) in the figure indicates the front side of the vehicle, here and hereinafter) of a major part for illustrating the seat mount structure according to the present invention, showing the condition where the seat 17 has been removed from the upper rear frames 37.

The left and right upper rear frames 37 are each provided with a seat bracket 261 for mounting the seat 17, and a cross member 118 is disposed bridgingly between the left and right upper rear frames 37.

The seat 17 includes, on its bottom plate 105, a tank-side cushion rubber 262 to be abutted on a rear surface 16a of the fuel tank 16, a tank-side lock piece 263 projected forwards for locking to the lower side of a tank projected portion 16b projected on a rear portion of the fuel tank 16, the above-mentioned left and right hooks 106 provided respectively on left and right bulged portion 264 bulged to the lower side, left and right intermediate portion cushion rubbers 267 to be abutted on the cross member 266 disposed bridgingly between the left and right upper rear frames 37, and left and right positioning projections 107 projected downwards from a base portion 268 for positioning on the cross member 118 side. Incidentally, a front-side cushion rubber 271 attached to the seat bracket 261 and left and right rear-side cushion rubbers 272 attached to the cross member 118 will be described later.

The bulged portions 264 and the hooks 106 on the seat 17 side and the seat bracket 261 and the front-side cushion rubber 271 on the upper rear frame 37 side constitute the above-mentioned front portion lock portion 66.

In addition, the base portion 268 and the positioning projections 107 on the seat 17 side and the cross member 118 and the rear-side cushion rubber 272 on the upper rear frame 37 side constitute the above-mentioned rear portion positioning portion 67.

Figure 4:
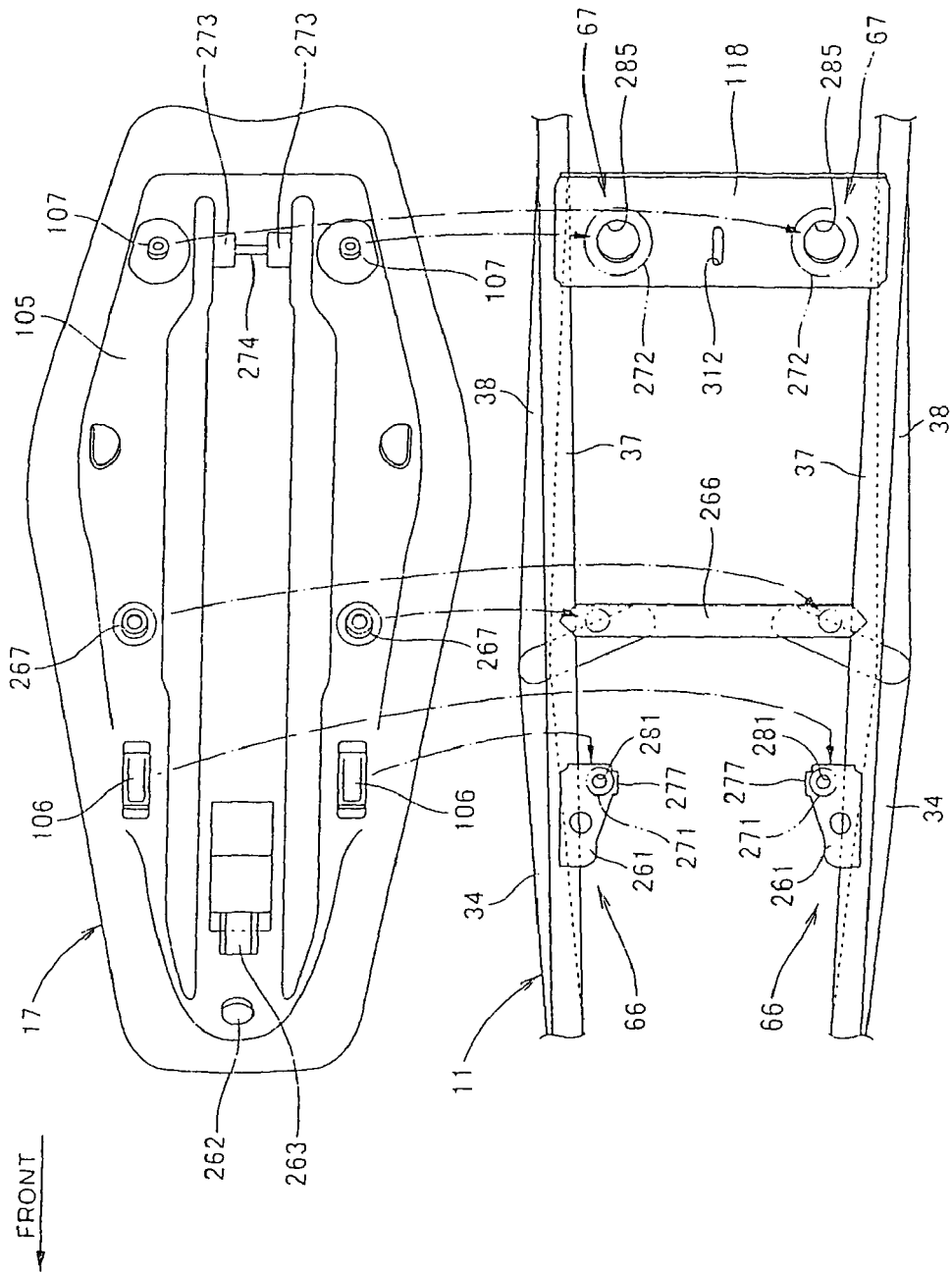
FIG. 4 is an illustration of a seat and a seat mount portion according to the present invention.

FIG. 4 is an illustration of the seat and a seat mount portion according to the present invention (the seat 17 is shown in bottom view, while the seat mount portion (on the vehicle body frame 11 side) is shown in plan view), showing that the hooks 106 are locked to the seat brackets 261 mounted respectively to the left and right upper rear frames 37, 37, the intermediate portion cushion rubbers 267, 267 are abutted on the cross member 266 disposed bridgingly between the left and right upper rear frames 37, 37, and the positioning projections 107, 107 are engaged with the cross member 118 disposed bridgingly between the left and right upper rear frames 37, 37. Incidentally, symbols 273, 273 denote projected portions provided on the bottom plate 105, and symbol 274 denotes a lock pin disposed bridgingly between the projected portions 273, 273 for locking a seat lock device which will be described later.

The tank-side cushion rubber 262 and the tank-side lock piece 263 are each disposed at the center in the vehicle width direction of the bottom plate 105.

Figure 5:
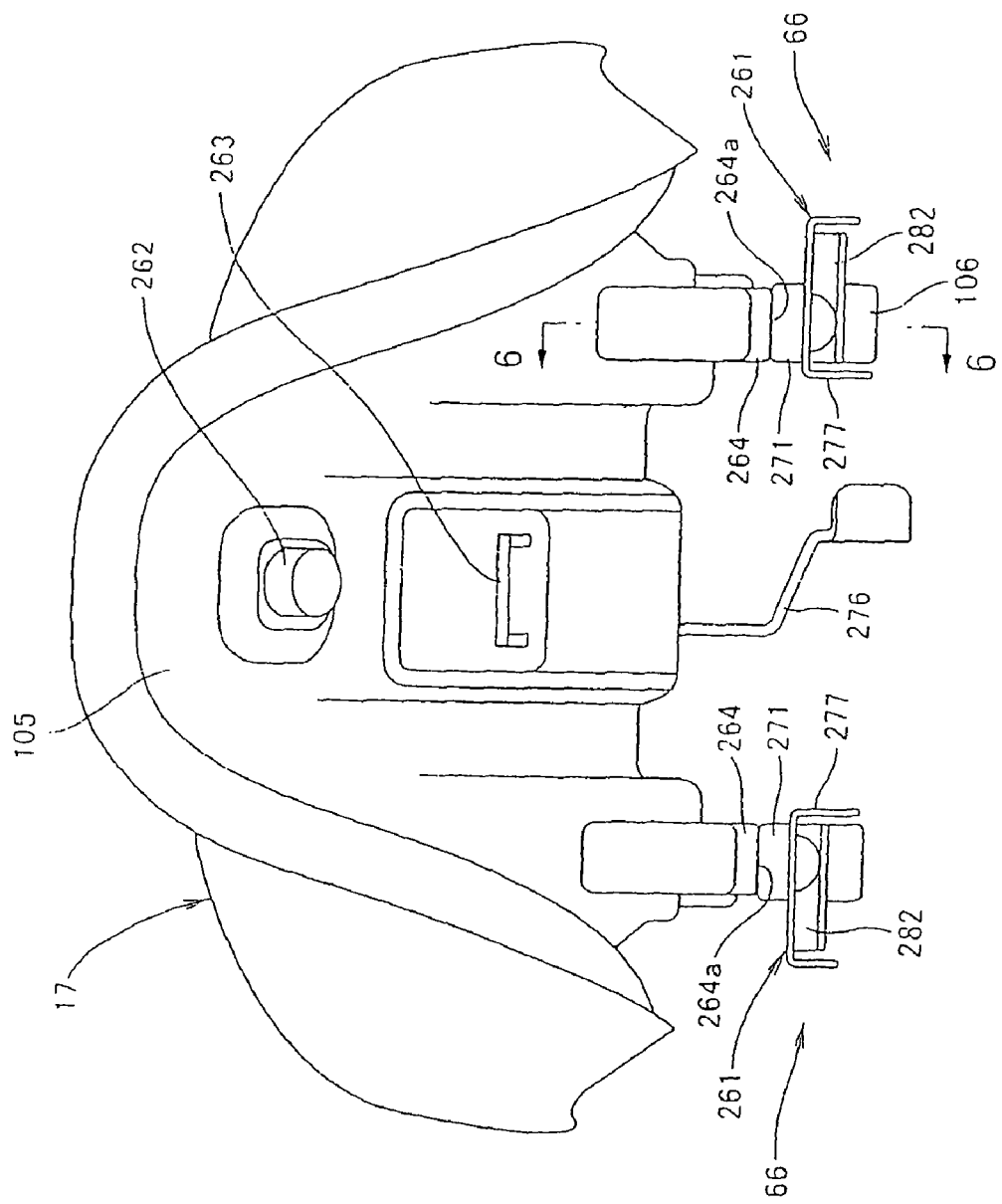
FIG. 5 is a front view showing a mounted condition of the seat according to the present invention.

FIG. 5 is a front view showing the mounted condition of the seat according to the present invention, showing the left and right front portion lock portions 66, 66.

Specifically, the figure shows that the hooks 106 are locked respectively to the left and right seat brackets 261, 261, and the bulged portions 264 constituting base portions of the hooks 106 are elastically supported by the front-side cushion rubbers 271 attached respectively to the seat brackets 261, 261. Incidentally, symbol 276 denotes a seat lock lever whose tip end is locked to the above-mentioned lock pin 274 (see FIG. 4).

Figure 6:
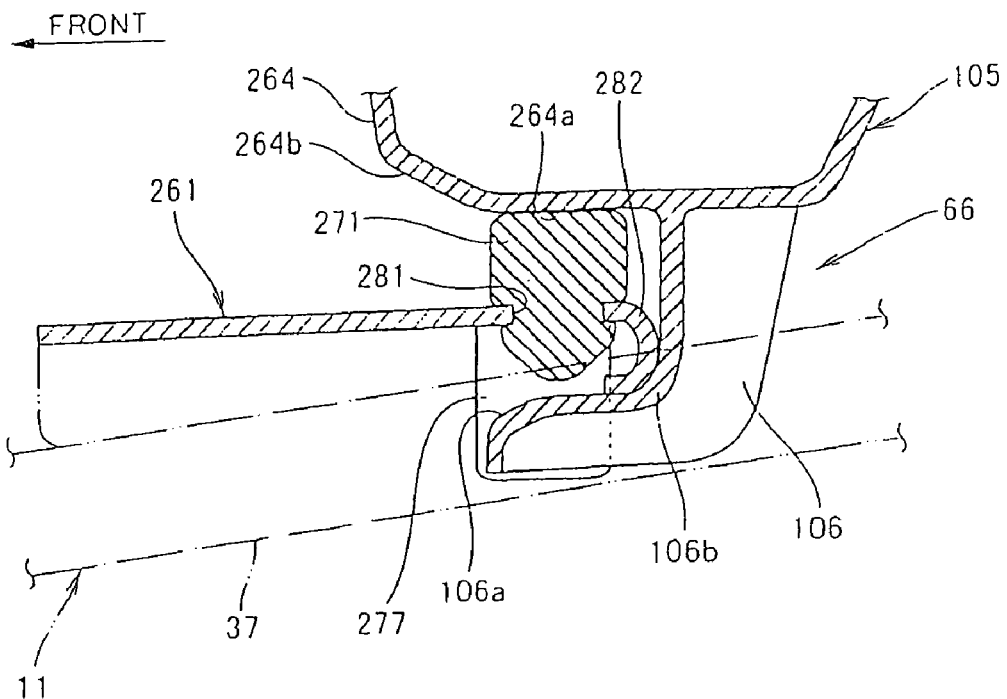
FIG. 6 is a sectional view along line 6-6 of FIG. 5.

FIG. 6 is a sectional view alone line 6-6 of FIG. 5, showing the front portion lock portion 66 in the condition where the hook 106 is locked to the seat bracket 261.

The seat bracket 261 is provided with a rubber fitting hole 281 at a position near a rear edge portion thereof, the rear edge portion is bent downwards to form a bent portion 282, and the front-side cushion rubber 271 is fitted in the rubber fitting hole 281. The bulged portion 264 of the bottom plate 105 is provided with the hook 106 integral with the lower surface 264a thereof.

Here, symbol 277 denotes a wall portion which is provided as one body with the seat bracket 261 so as to be located on the inner side of the hook 106 thus fitted, serves as a guide at the time of locking the hook 106, and prevents the locked hook 106 from getting out of position to the inner side in the vehicle width direction. In addition, symbols 106a, 264b are inclined surfaces provided respectively in the hook 106 and the bulged portion 264 for facilitating the locking at the time of locking the hook 106 to the seat bracket 261.

In the condition where the hook 106 is locked to the seat bracket 261, an elastic force of the front-side cushion rubber 271 pushes up the lower surface 264a of the bulged portion 264, so that a corner portion 106b of the hook 106 is pressed against the bent portion 282 of the seat bracket 261.

Thus, the front portion lock portion 66 in the present invention is a portion which is locked to the seat bracket 261 with the hook 106 and receives the load of the seat 17 with the front-side cushion rubber 271, and, when the hook 106 is locked to the bent portion 282 (the condition shown in the figure), the front-side cushion rubber 271 is located on the inside of the hook 106, i.e., the hook 106 and the front-side cushion rubber 271 are at substantially the same position.

Thus, by the structure in which the front-side cushion rubber 271 for supporting the load on the seat 17 side provided at the position of the hook 106, in the present invention a large bending moment is not generated in the hook 106 at the lock position, as contrasted to the structure in which the locking position and the load bearing position are spaced from each other as in the related art.

In addition, as can be seen by returning to FIG. 4, since the locking position is also the load bearing position, the front-side cushion rubbers 271, 271 are added to the tank-side cushion rubber 262, the intermediate portion cushion rubbers 267, 267 and the rear-side cushion rubbers 272, 272 constituting the load bearing positions shown in FIG. 4, so that the load on the seat 17 side can be dispersedly received by only small changes on the vehicle body frame 11 side (namely, in FIG. 6, the bottom plate 105 is provided with the lower surface 264a of the bulged portion 264, and the seat bracket 261 is provided with the rubber fitting hole 281) and the addition of the front-side cushion rubbers 271, 271.

For example, when the number of load bearing positions is simply increased separately from the locking position, large changes are required on the bottom plate side and the vehicle body frame side for providing the load bearing position, with the result of complication of the shapes of the bottom plate and the vehicle body frame or an increase in the number of component part; such an inconvenience can be dissolved according to the present invention.

Figure 7:
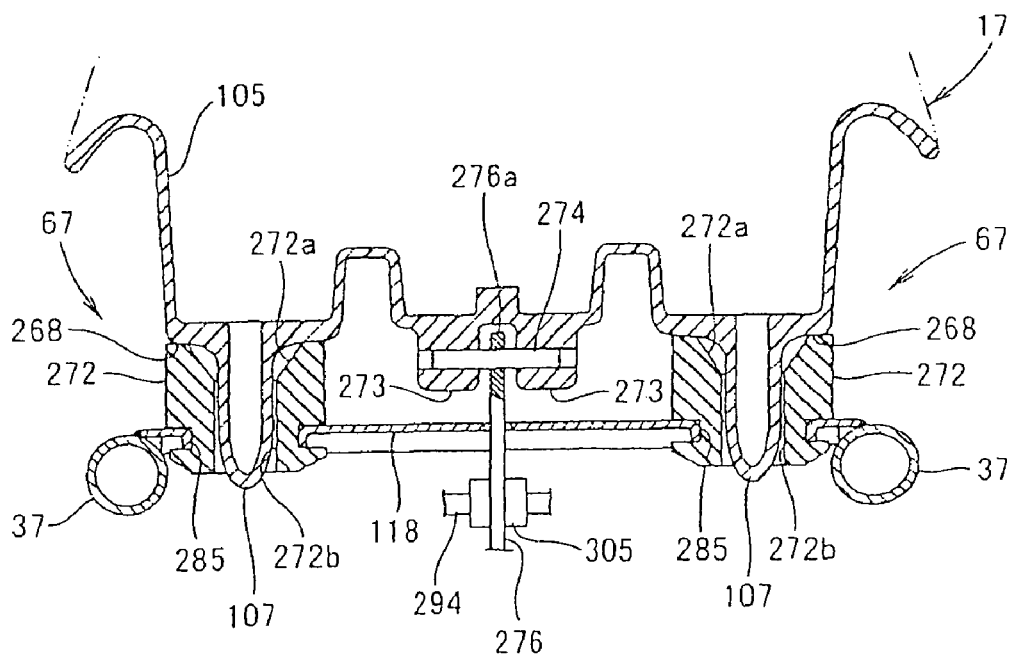
FIG. 7 is a sectional view showing the seat mount structure at a rear portion positioning portion according to the present invention.

FIG. 7 is a sectional view showing the seat mount structure at the rear portion positioning portion according to the present invention, showing the lock portions of the left and right rear portion positioning portions 67, 67 and a seat lock device.

The cross member 118 is provided with rubber fitting holes 285, 285, and rear-side cushion rubbers 272 are fitted respectively in the rubber fitting holes 285, 285.

The rear-side cushion rubber 272 is provided with a tapered hole 272a and a through-hole 272b, the positioning projection 107 on the seat 17 side is inserted in the tapered hole 272a and the through-hole 272b, and a base portion 268 of the bottom plate 105 is abutted on the upper surface of the rear-side cushion rubber 272.

The seat lock lever 276 is provided with a hook portion 276a at the upper end thereof, and the hook portion 276a is hooked on the lock pin 274, whereby a rear portion of the seat 17 is locked and prevented from being disengaged.

Figure 8:
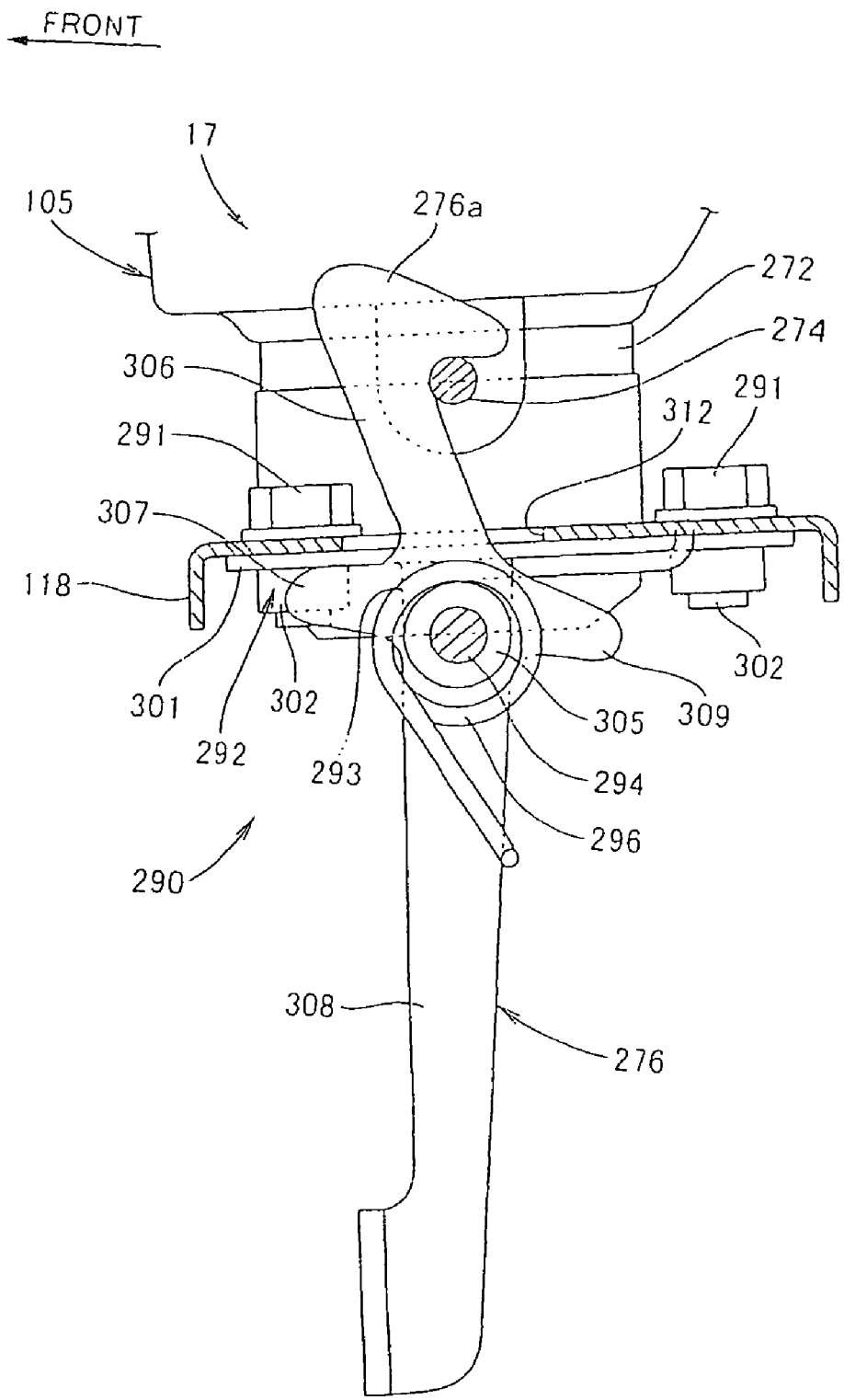
FIG. 8 is a side view of a seat lock device according to the present invention.

FIG. 8 is a side view (partly in section) of the seat lock device according to the present invention, in which the seat lock device 290 is composed of a base portion 292 mounted to the cross member 118 by a plurality of bolts 291, a support shaft 294 mounted to a lower projected portion 293 provided at the base portion 292, the above-mentioned seat lock lever 276 swingably mounted on the support shaft 294, and a torsion coil spring 296 for biasing the seat lock lever 276 in the direction for locking to the lock pin 274.

The base portion 292 is composed of a plate 301 abutted on the back surface of the cross member 118, a plurality of nuts 302 attached to the lower surface of the plate 301, and the above-mentioned lower projected portion 293, and the base portion 292 is attached to the cross member 118 by screwing the bolts 291 into the nuts 302.

The seat lock lever 276 is composed of a bearing portion 305 to be fitted over the support shaft 294, a first arm portion 306 provided with a hook portion 276a at the upper end thereof, a second arm portion 307 serving as a stopper by being abutted on the plate 301 at the time of seat lock, a third arm portion 308 to be operated by hand for unlocking the seat, and a fourth arm portion 309 serving as a stopper by being abutted on the plate 301 when the third arm portion 308 is swung for unlocking the seat. Incidentally, symbol 312 denotes a slot opened in the cross member 118 for passing the first arm portion 306 therethrough.

The torsion coil spring 296 is a member which has its one end hooked on the cross member 118 or the plate 301 and its other end hooked on the third arm portion 308, thereby biasing the seat lock lever 276 clockwise.

At the time of unlocking the seat 17, the third arm 308 is swung counterclockwise against the elastic force of the torsion coil spring 296, with the support shaft 294 as a center, and the hook portion 276a is disengaged from the lock pin 274, when the seat 17 is raised by the elastic force of the rear-side cushion rubber 272, and the seat 17 is unlocked.

Figure 9:
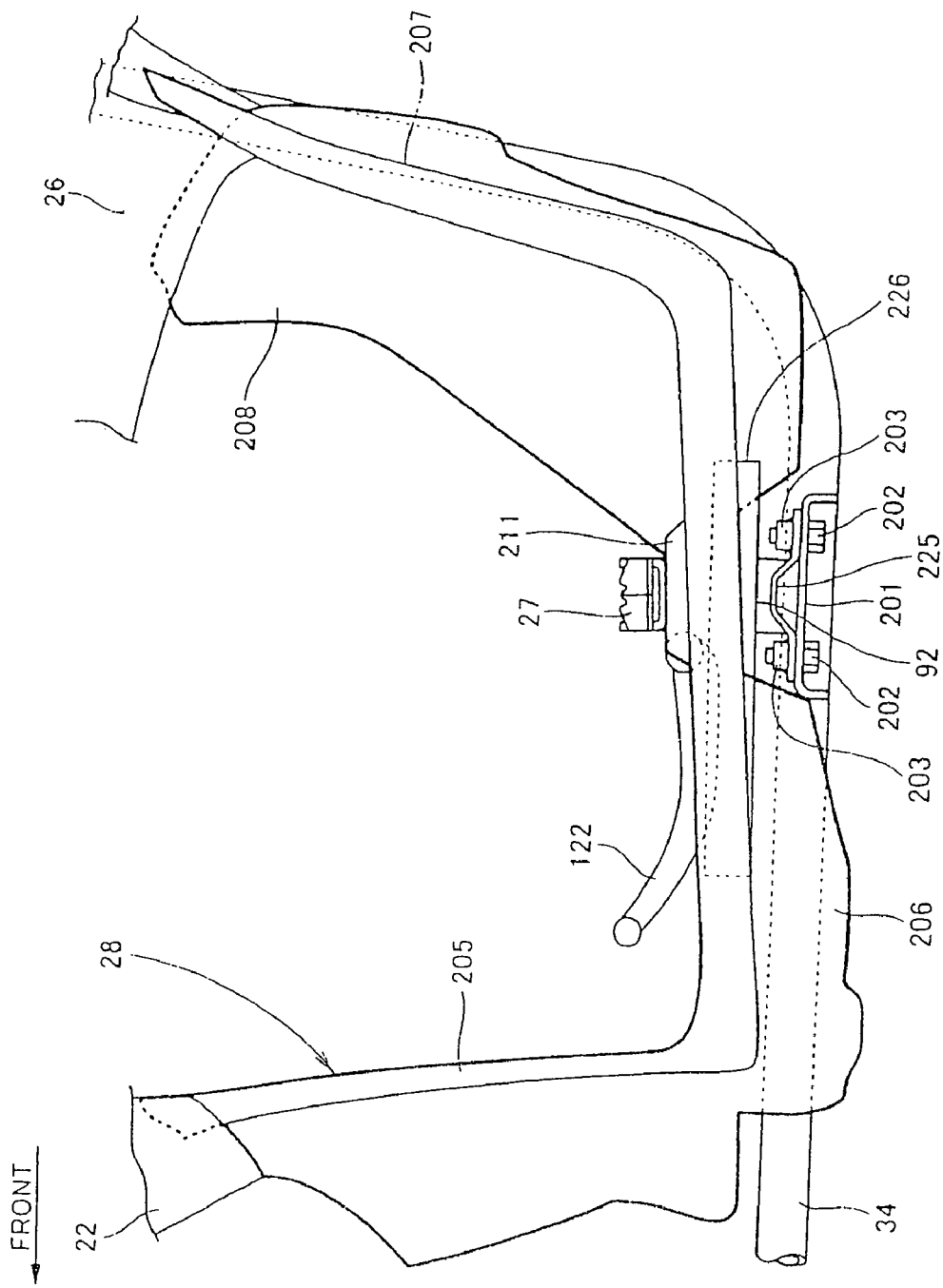
FIG. 9 is a side view of a major part of the saddle ride vehicle according to the present invention.

FIG. 9 is a side view of a major part of the saddle ride vehicle according to the present invention (arrow (FRONT) in the figure indicates the vehicle front side), showing that a lower bracket 201 is mounted to the lower main frame 34, the foot bracket 92 is mounted to the lower bracket 201 by a plurality of bolts 202, and the foot board 28 (the portion whose profile is drawn in bold line) is supported by the foot bracket 92. Incidentally, symbol 203 denotes a nut fixed to the foot bracket 92 for screwing the bolt 202 therein.

The foot board 28 is a resin-made component part roughly angular U-shaped in side view, in which a front wall 205 connected to the front fender 22, a bottom wall 206 extended rearwards from the lower end of the front wall 205, a rear wall 207 extended roughly upwards from the rear end of the bottom wall 206 and connected to the rear fender 26, and a side plate 208 provided on the depth side of a rear portion of the bottom plate 206 and the rear wall 207, are integrally molded, with the lower end of the bottom wall 206 and the rear end of the rear wall 207 being set substantially along the lower main frame 34. Incidentally, symbol 211 denotes a mount-shaped portion molded integrally with the foot board 28 so as to extend in the vehicle width direction for mounting the foot rest 27.

Figure 10:
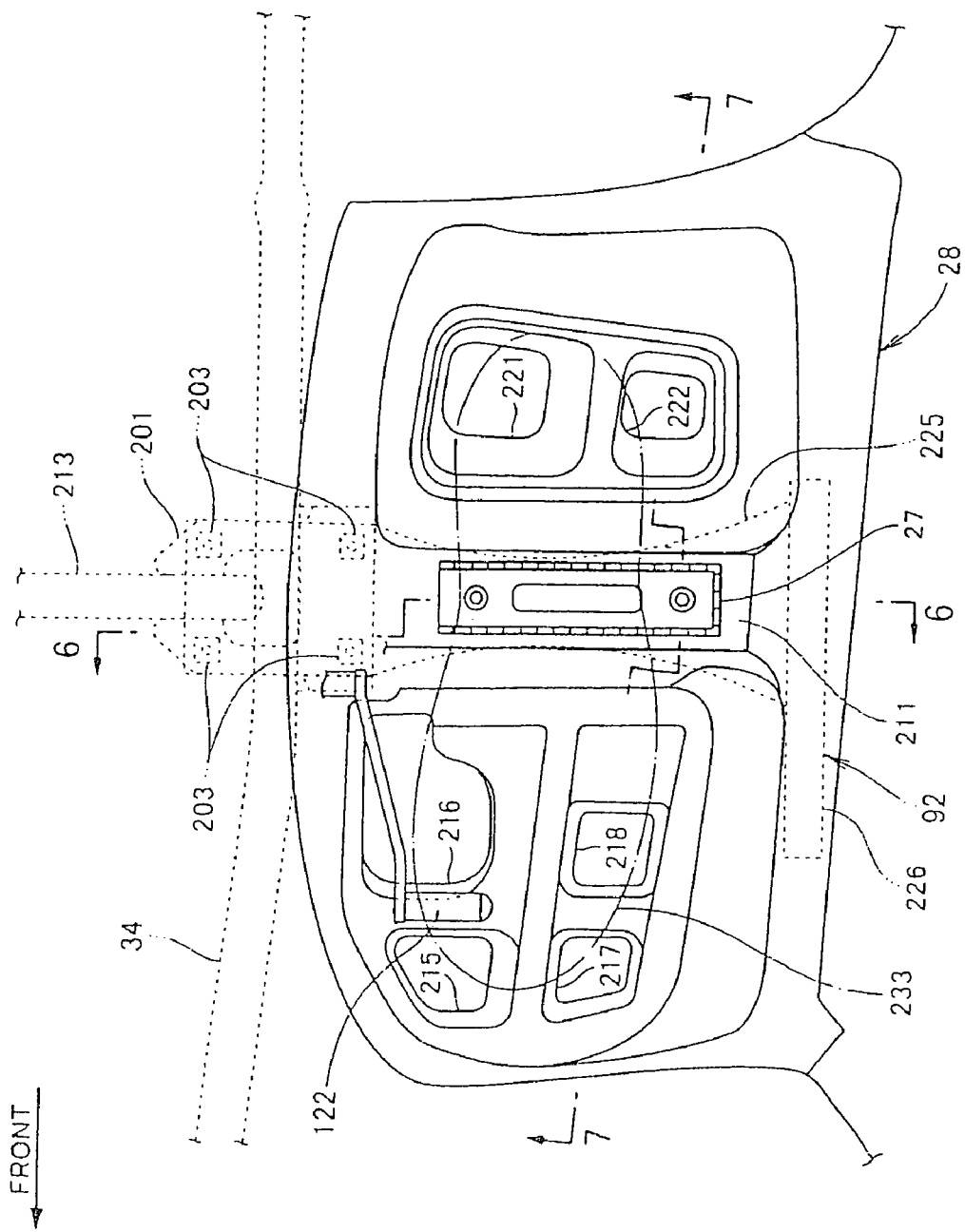
FIG. 10 is a plan view of a part of the saddle ride vehicle according to the present invention.

FIG. 10 is a plan view of a major part of the saddle ride vehicle according to the present invention, in which the lower bracket 201 for mounting thereto the foot bracket 92 roughly L-shaped in plan view is a member mounted to, in addition to the lower main frame 34, a cross member 213 disposed bridgingly between the left and right lower main frames 34, 34 (only symbol 34 on one side is shown). Incidentally, symbols 215 to 218 and symbols 221 and 222 denote opening portions formed in the foot board 28 for preventing stagnation of muddy water or the like.

The foot bracket 92 supports the foot board 28 at a portion somewhat on the rear side relative to the center in the vehicle front-rear direction. With the foot rest 27 disposed at an upper portion of the foot bracket 92, it is possible to enlarge the area 27 on the front side relative to the foot rest 27, to ensure easy operation of the change pedal 122 by the driver's foot, and to allow the foot to be placed in an easy posture during driving.

Figure 11:
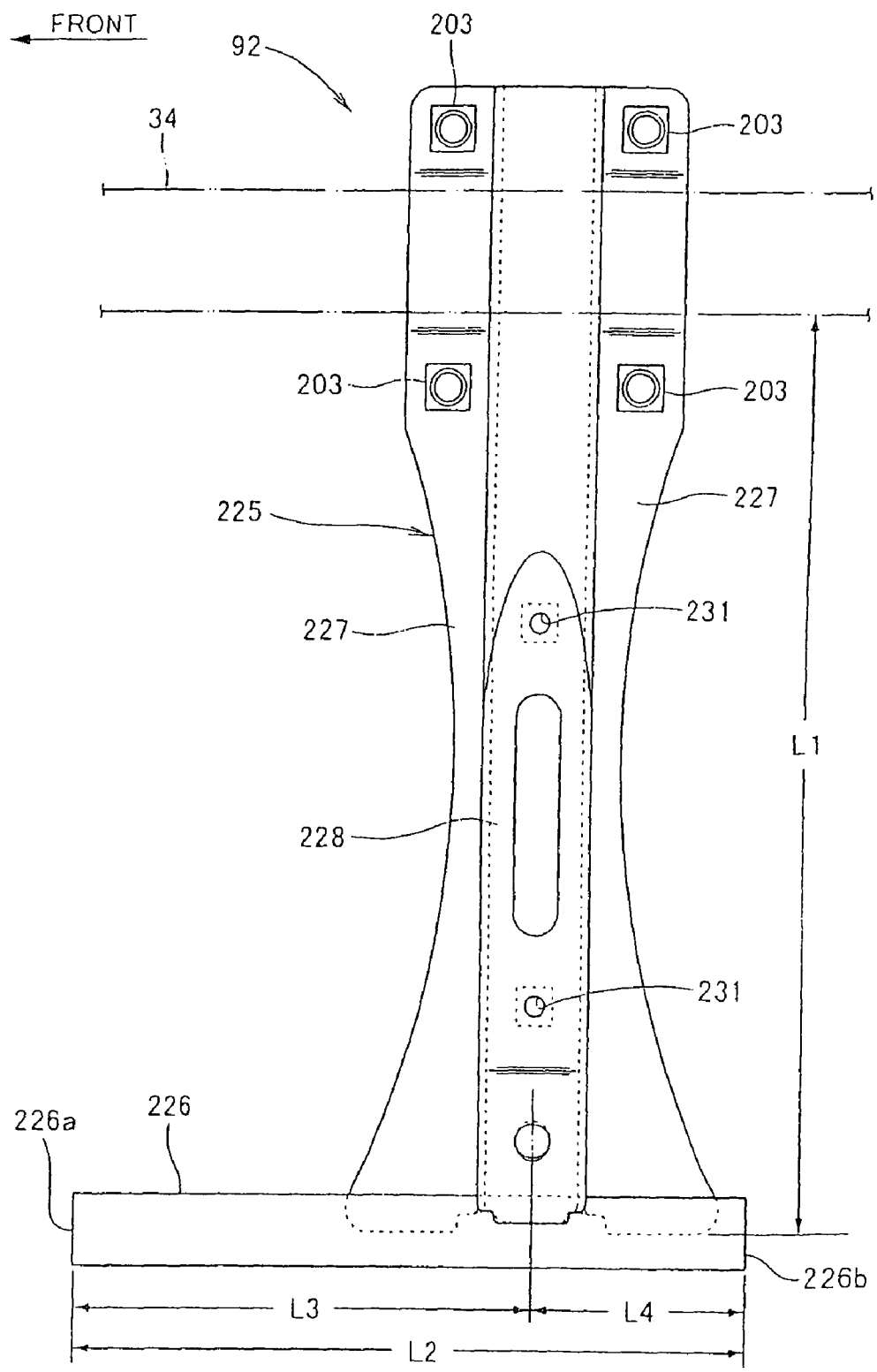
FIG. 11 is a plan view of a foot bracket according to the present invention.

FIG. 11 is a plan view of the foot bracket according to the present invention, in which the foot bracket 92 is composed of a first bracket 225 extended in the vehicle width direction, and a second bracket 226 mounted to the tip end of the first bracket 225 orthogonally to the first bracket 225 so as to extend in the vehicle front-rear direction. The first bracket 225 is a member in which a plurality of nuts 203 for mounting to the lower bracket 201 (see FIG. 4) are attached to flange portions 227, 227, and a flat portion 228 for mounting the foot board 28 (see FIG. 4) thereon is provided with bolt insertion holes 231, 231 for inserting foot rest mounting bolts therethrough.

Here, let the length of the first bracket 225 (the length from the lower main frame 34 to the tip end of the first bracket 225) be L1, let the length of the second bracket 226 be L2, let the distance from the width center of the first bracket 225 to the front end 226a of the second bracket 226 be L3, and let the distance from the width center of the first bracket 225 to the rear end 226b of the second bracket 226 be L4, then the length L1 and the length L2 satisfy the relationship of $0.5L1 < L2 < L1$.

In the case where the length L2 of the second bracket is smaller than 0.5L1, i.e., one half of the length of the first bracket 225, in FIG. 4, the proportion of the length L2 of the second bracket 226 based on the front-rear length of the foot board 28 connected to the front fender 22 and the rear fender 26 becomes small, and the portion for supporting the foot board 28 is decreased, so that the foot board 28 becomes liable to be deflected.

In addition, returning to FIG. 11, in the case where the length L2 of the second bracket 226 is greater than the length L1 of the first bracket 225, the second bracket 226 becomes long, and the weight of the foot bracket 92 increases.

The distance L3 and the distance L4 satisfy the relationship of $L3 > L4$.

This is for ensuring that, in FIG. 4, since the driver's foot 233 mounted on the foot rest 27 projects more to the front side of the foot rest 27 than to the rear side of the foot rest 27, the foot board 28 would not be liable to be deflected even if a high load is exerted on the foot board 28 on the front side relative to the foot rest 27.

Figure 12:
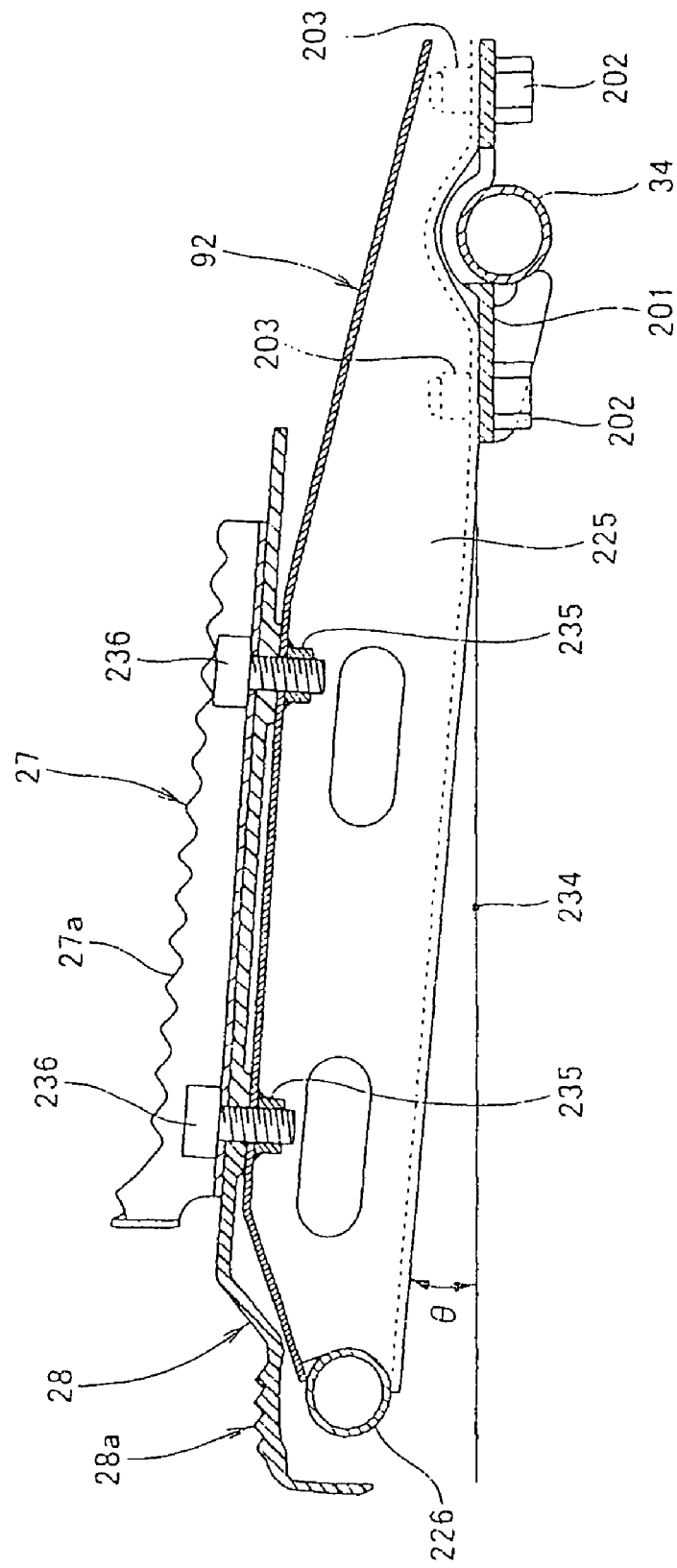
FIG. 12 is a sectional view along line 6-6 of FIG. 10.

FIG. 12 is a sectional view along line 6-6 of FIG. 10, showing that the foot bracket 92 is mounted to the lower bracket 201 at an angle against the horizontal line 234 so that the outer side in the vehicle width direction is higher than the inner side in the vehicle width direction, the foot board 28 is clamped between the foot bracket 92 and the foot rest 27, and, in this condition, the assembly is fastened by nuts 235, 235 attached to the foot bracket 92 and bolts 236, 236.

The foot rest 27 is a member provided with an upper edge portion 27a which is roughly sawtooth-shaped for preventing slippage.

The foot board 28 is provided at the upper surface of an edge portion thereof with a rugged portion 28a composed of a plurality of ridges and a plurality of recesses for preventing slippage.

The second bracket 226 constituting the foot bracket 92 is composed of a metallic pipe.

Figure 13:
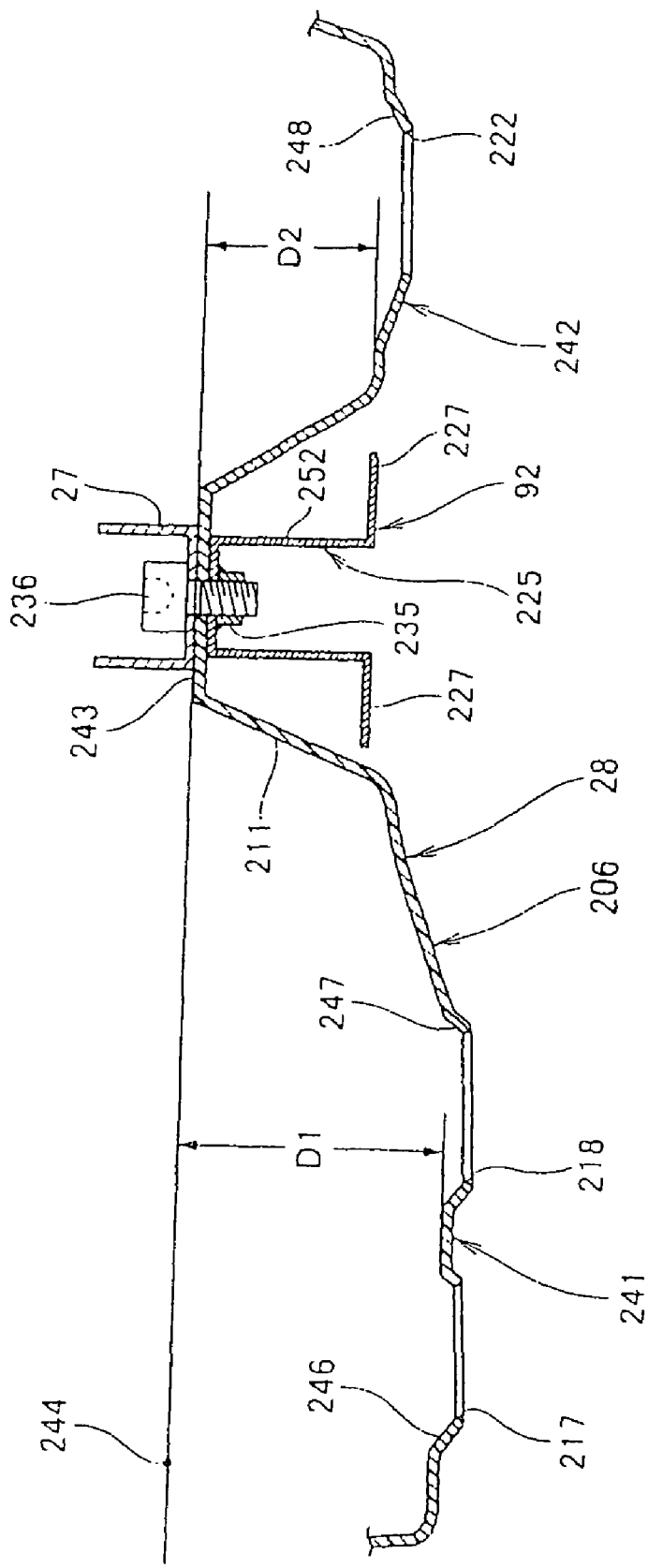
FIG. 13 is a sectional view along line 7-7 of FIG. 10.

FIG. 13 is a sectional view along line 7-7 of FIG. 10, in which the foot board 28 includes, on its bottom wall 206, a mount-shaped portion 211, a front board portion 241 provided on the front side of the mount-shaped portion 211, and a rear board portion 242 provided on the rear side of the mount-shaped portion 211. Let the height difference of the front board portion 241 relative to an extension line 244 of a flat top surface 243 of the mount-shaped portion 211 be D1, and let the height difference of the rear board portion 242 be D2, then the height difference of the front board portion 241 is greater than the height difference of the rear board portion 242 ($D1 > D2$). In other words, the front board portion 241 is lower than the rear board portion 242. Since a step-in portion of the change pedal 122 (see FIG. 3. The brake pedal 91 (see FIG. 2) on the side of the foot board 28 on the vehicle right side) is present on the front board portion 241 side, the front board portion 241 side is set lower so as to avoid interference with the step-in portion. Incidentally, symbols 246 to 248 in the figure denote tapered portions provided in the surroundings of the opening portions 217, 218, 222, respectively.

The foot rest 27 is a member angular U-shaped in section, and the first bracket 225 of the foot bracket 92 is a member including an erected portion 252 angular U-shaped in section, and flange portions 227, 227 bent to both sides from the lower end of the erected portion 252, which are integrally molded.

Figure 14:
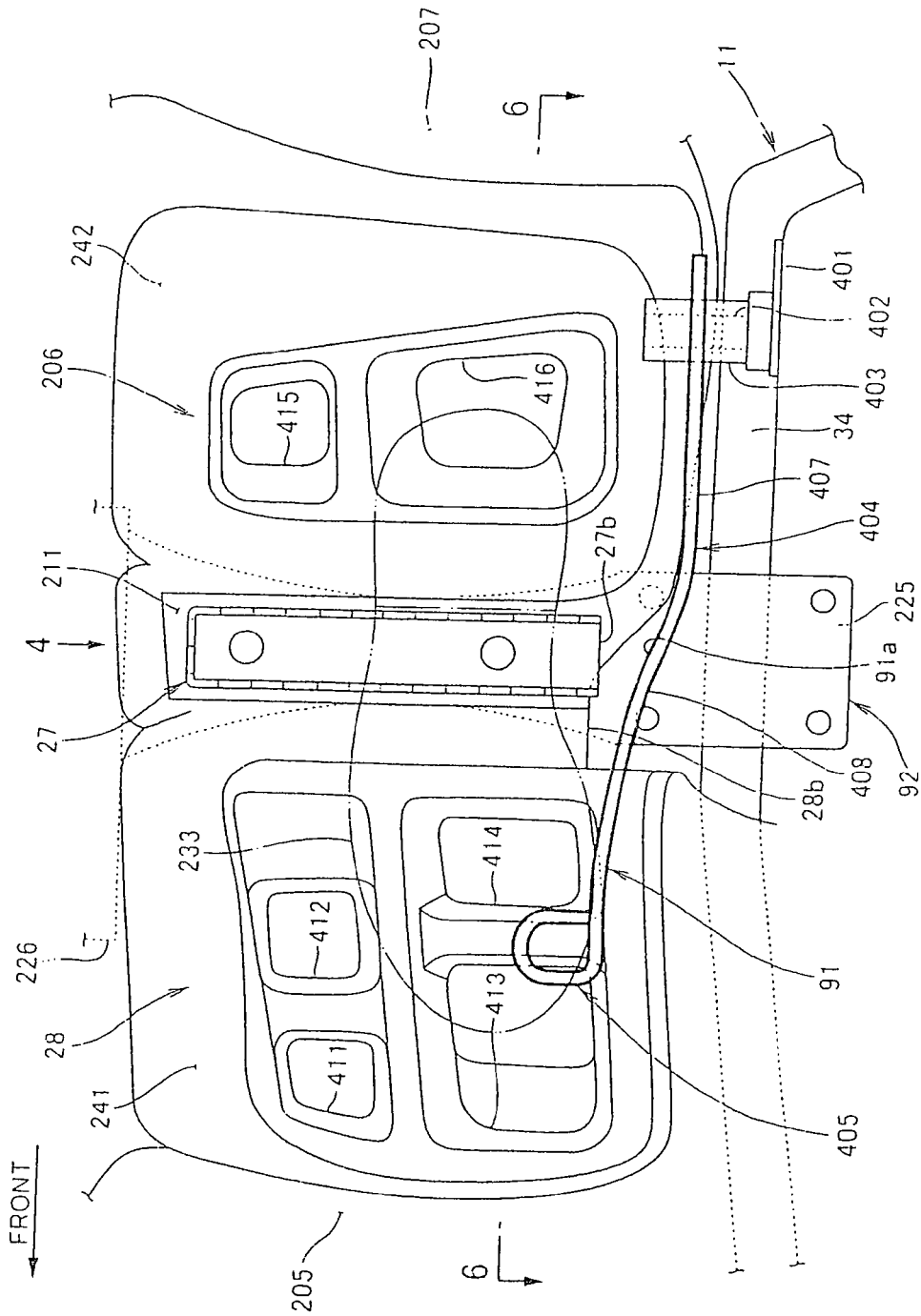
FIG. 14 is a plan view of a major part for illustrating a brake pedal according to the present invention.

FIG. 14 is a plan view of a major portion for illustrating the brake pedal according to the present invention (in the figure, arrow (FRONT) indicates the vehicle front side here and hereinafter), showing that a pivot plate 401 is mounted to the side of the vehicle body frame 11, specifically the lower main frame 34, a swing shaft 402 is mounted to the pivot plate 401, a bearing portion 403 is rotatably mounted to the swing shaft 402, and the brake pedal 91 (the portion indicated by bold line) is mounted to the bearing shaft 403 so as to extend to the vehicle front side.

The brake pedal 91 is composed of an arm portion 404 having a rear end portion mounted to the bearing portion 403, and a pedal portion 405 integrally molded by bending the tip end portion side of the arm portion 404, and the arm portion 404 is composed of a straight portion 407 provided in a straight form at a rear portion, and a bent portion 408 bent from the front end of the straight portion 407 to the outside in the vehicle width direction.

The pedal portion 405 is a portion having been bent into a loop form and then having its tip end welded to the arm portion 404.

The foot rest 27 is a member mounted on a mount-shaped portion 211 formed to be high while extending in the vehicle width direction at a substantially central portion in the front-rear direction of the foot board 28, and has its inner end surface 27b (the end surface on the inside in the vehicle width direction) spaced to the outside in the vehicle width direction from a side surface 91a of the brake pedal 91.

The foot bracket 92 is composed of a first bracket 225 having its one end mounted to the lower main frame 34 and being extended to the outside in the vehicle width direction, and a second bracket 226 mounted to the tip end of the first bracket 225 in the state of being extended in the vehicle front-rear direction.

Here, symbol 28b denotes a cutout portion provided at a position nearer to the vehicle body center relative to the foot board 28 and on the lower side of the brake pedal 91, and symbols 411 to 416 are opening portions provided in the foot board 28 so as to obviate stagnation of muddy water or the like.

Figure 15:
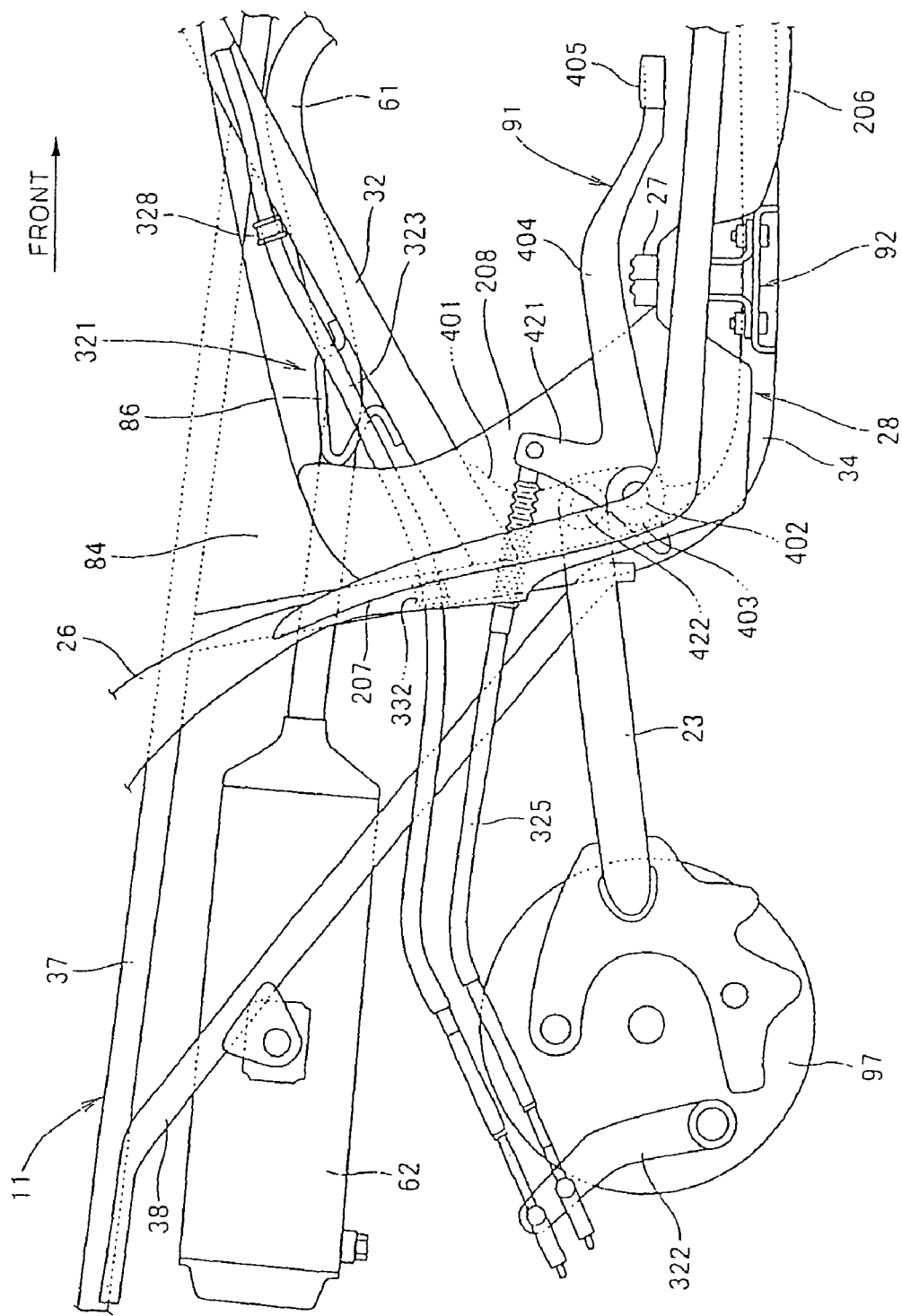
FIG. 15 is a view along arrow 4 of FIG. 14.

FIG. 15 is a view along arrow 4 of FIG. 14, showing a right side view of the vehicle body.

The brake pedal 91 is a member which is vertically movably mounted, through a bearing portion 403, to the swing shaft 402 provided on the pivot plate 401, and in which an arm portion 404 close to an upper portion of the foot rest 27 is bent to be projected to the upper side.

The arm portion 404 is a portion which includes a sub-arm portion 421 at a rear portion thereof, one end of a brake cable 325 is connected to the sub-arm portion 421, and the other end of the brake cable 325 is connected to a brake arm 322 connected to the drum brake 97.

The pivot plate 401 is a member mounted to a connection portion between the upper inclined frame 32 and the lower main frame 34, and is provided with a pivot shaft 422 for swingably mounting thereto the front end of the swing arm 23.

The foot board 28 is a resin made component part substantially angular U-shaped in side view, in which a front wall 205 (see FIG. 14) connected to the front fender 22 (see FIG. 1), a bottom wall 206 extended rearwards from the lower end of the front wall 205, a rear wall 207 extended substantially upwards from the rear end of the bottom wall 206 and connected to the rear fender 26, and a side plate 208 provided on the depth side of both a rear portion of the bottom wall 206 and the rear wall 207, these walls and plate being integrally molded, with the lower end of the bottom wall 206 and the rear end of the rear wall 207 being set substantially along the lower main frame 34.

Here, symbol 321 denotes a triangular opening portion surrounded by the upper inclined frame 32, the side cover 84 and the side plate 208 of the foot board 28, symbol 323 denotes a brake cable laid to extend from the left brake lever 111 (see FIG. 2) to the brake arm 322 of the drum brake 97, and symbols 328 and 332 denote fixtures for attaching the brake cable 323 to the upper inclined frame 32 and the lower main frame 34 respectively.

Figure 16:
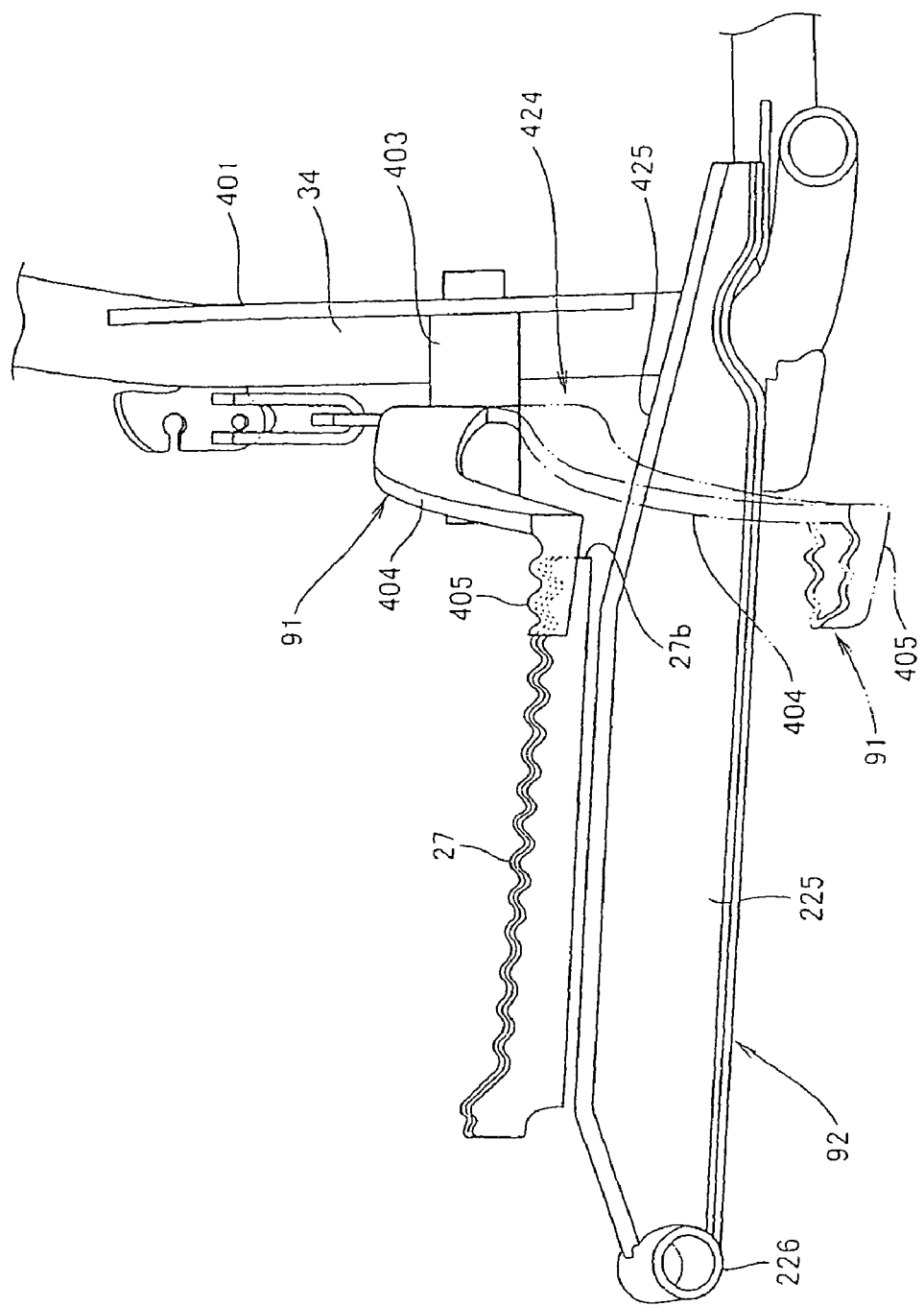
FIG. 16 is an illustration of the brake pedal according to the present invention.

FIG. 16 is an illustration of the brake pedal according to the present invention, showing the brake pedal 91 as viewed from the vehicle front side. Incidentally, the foot board 28 (see FIG. 15) is omitted.

A space 424 on the lower side of the brake pedal 91, specifically, the space 424 formed on the inner side in the vehicle width direction of the inner end surface 27b of the foot rest 27, on the upper side of an inside inclined portion 425 provided at an upper portion of the foot bracket 92, and on the outer side in the vehicle width direction of the lower main frame 34, is a space in which the stepped-in brake pedal 91 (the portion indicated by imaginary line) is located, i.e., a space into which the brake pedal 91 is to be stepped in.

Conventionally, the brake pedal has been disposed on the lower side of the foot board, and the tip end of the brake pedal has been projected upwards through a hole opened in the foot board. In the present invention, for disposing the brake pedal 91 on the upper side of the foot board 28, the inner end surface 27b of the foot rest 27 is moved to the outer side in the vehicle width direction, a cutout portion 28b (see FIG. 14) is formed on the inside of the foot board 28, and an inside inclined portion 425 is provided at an upper portion of the foot bracket 92, whereby the space 424 into which the brake pedal 91 is to be stepped in is formed. Incidentally, in place of the inside inclined portion 425, the foot bracket 92 may be provided with a recessed portion for avoiding the brake pedal 91 stepped in.

As a result, in the present invention, notwithstanding the brake pedal 91 is disposed on the upper side of the foot board 28, the brake pedal 91 can be stepped in to a low position, and the same operability of the brake pedal 91 as in the related art can be secured.

Figure 17:
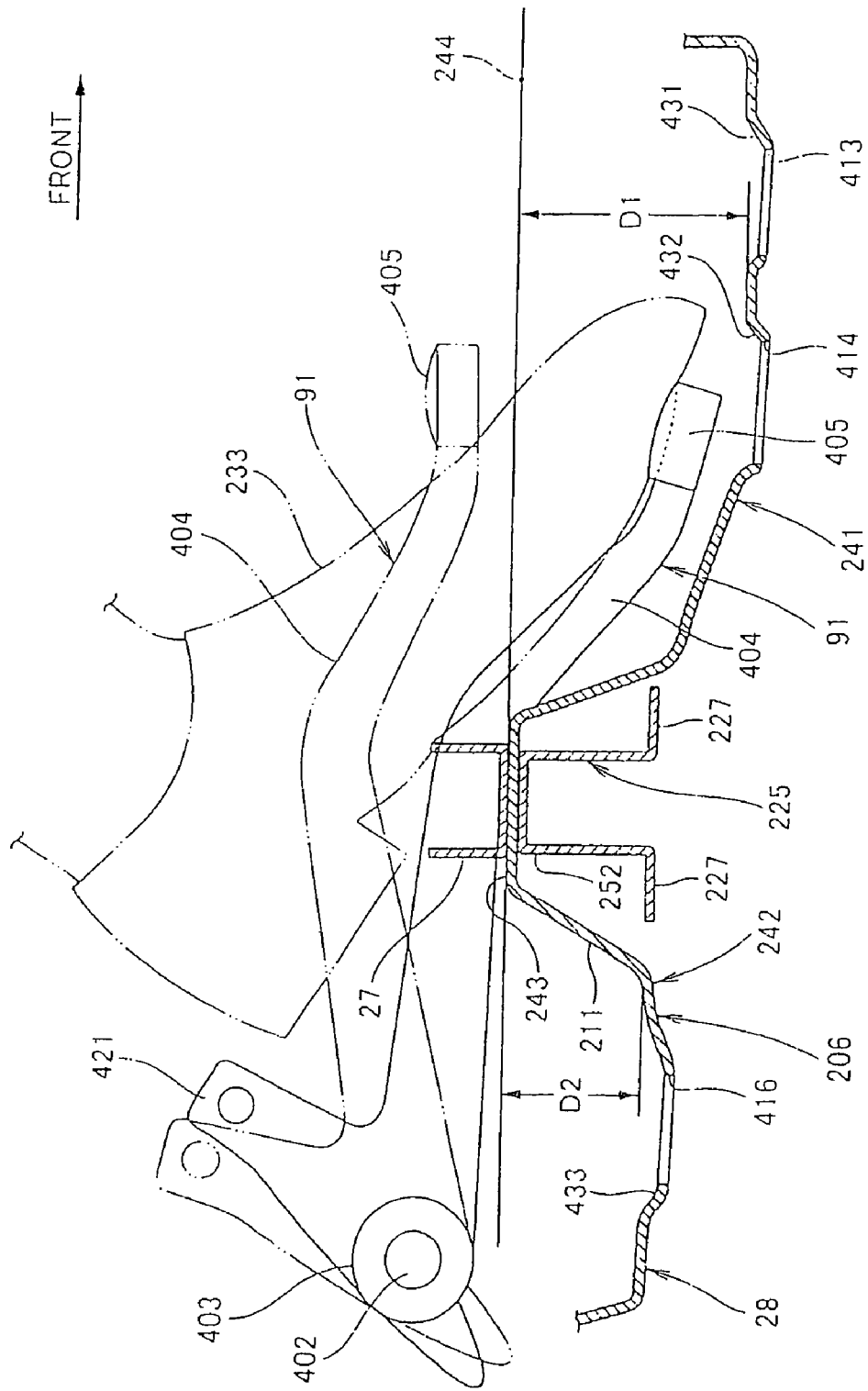
FIG. 17 is a sectional view along line 6-6 of FIG. 14.

FIG. 17 is a sectional view along line 6-6 of FIG. 14, showing the condition where the brake pedal 91 is stepped in by a foot 233. (The brake pedal 91 indicated by imaginary line is the brake pedal 91 before being stepped in.)

The foot board 28 includes, on the bottom wall 206, a mount-shaped portion 211, a front board portion 241 provided on the front side of the mount-shaped portion 211, and a rear board portion 242 provided on the rear side of the mount-shaped portion 211. Let the height difference of the front board portion 241 relative to an extension line 244 of a flat top surface 243 of the mount-shaped portion 211 be D1, and let the height difference of the rear board portion 242 relative to the rear board portion 242 be D2, the height difference of the front board portion 241 is greater than the height difference of the rear board portion 242 (D1>D2). Namely, the front board portion 241 is lower than the rear board portion 242.

This means that, in view of the presence of the step-in portion (i.e., pedal portion 405) of the brake pedal 91 on the side of the front board portion 241, the front board portion 241 side is set lower so as to obviate its interference with the step-in portion. Incidentally, symbols 431 to 433 in the figure denote tapered portions provided in the surroundings of the opening portions 413, 414, and 416, respectively.

The foot rest 27 is a member angular U-shaped in section, and a first bracket 225 of the foot bracket 92 is a member in which an erected portion 252 angular U-shaped in section and flange portions 227, 227 bent to both sides from the lower end of the erected portion 252 are integrally molded.

Since the foot board 28 is thus provided with the front board portion 241 which is largely sunken downwards, the position of the brake pedal 91 before stepping-in can be set low, and the movable range of the brake pedal 91 can be enlarged.

As has been described referring to FIGS. 4 and 6, the present invention is firstly characterized in that, in the seat mount structure for the saddle ride vehicle 10 including the seat brackets 261 as brackets on the vehicle body frame 11, including the hooks 106 provided on the bottom plate 105 of the seat 17, and locking the hooks 106 to the seat brackets 261 to thereby mount the seat 17 to the vehicle body frame 11, the front-side cushion rubbers 271 as elastic bodies for receiving the load on the seat 17 side are mounted to the seat brackets 261 so that the front-side cushion rubbers 271 are located on the inner side of the hooks 106 when the hooks 106 are locked to the seat brackets 261.

The lock position for locking the seat 17 to the vehicle body frame 11 side and the support position for supporting the seat 17 to the vehicle body frame 11 side are set substantially the same, whereby in the present invention the bending moment generated in the hooks 106 located at the lock positions can be suppressed, as compared with the case where the lock position and the support position for the seat 17 are different as in the related art.

In addition, since the seat 17 is supported also at the lock positions, the number of the support positions is increased, the load can be dispersed more than in the related art, deformation of the bottom plate 105 of the seat 17 can be restrained, and the ride comfort can be enhanced.

The present invention is secondly characterized in that the hooks 106 are provided at the substantially lowermost portions of the bottom plate 105 of the seat 17, as shown in FIG. 3.

Since the hooks 106 are provided at the substantially lowermost portions of the bottom plate 105 of the seat 17 and the support positions for the seat 17 are provided at portions where a high load is exerted, the load can be efficiently borne and dispersed, the deformation of the bottom plate 105 of the seat 17 can be suppressed more, and the ride comfort can be enhanced more.

The present invention is thirdly characterized in that the wall portions 277 for restricting the positions of the hooks 106 are provided near the vehicle body center in the vehicle width direction of the seat brackets 261, as shown in FIG. 5.

The positioning of the hooks 106 at the time of mounting the seat 17 can be securely performed with the wall portions 277, and the seat 17 can be mounted easily. In addition, the wall portions 277 can prevent the seat 17 from getting out of position in the vehicle width direction during riding.

The present invention is fourthly characterized in that the rear portion of the seat 17 is supported on the vehicle body frame 11 through the rear-side cushion rubbers 272 serving as elastic bodies, as shown in FIGS. 3 and 7.

Since the rear portion of the seat 17 is elastically supported by the rear-side cushion rubbers 272, vibrations can be prevented from being transmitted from the vehicle body side to the seat 17.

Incidentally, while the wall portions of the brackets are arranged near the vehicle body center in the vehicle width direction in the present invention, the invention is not limited to this arrangement, and the wall portions may be arranged at positions on the outer sides in the vehicle width direction of the left and right hooks locked.

As has been described referring to FIGS. 1, 10, and 12 above, the present invention is fifthly characterized in that, in the saddle ride vehicle 10 including the front fenders 22 covering from the upper side to the rear side of the front wheels 21 and the rear fenders 26 covering from the front side to the upper side of the rear wheels 24, the vehicle 10 includes the foot boards 28 connecting the front fenders 22 and the rear fenders 26 to each other and disposed near the driver's feet, and the foot boards 28 are each supported in the state of being clamped between the foot bracket 92, which is composed of the first bracket 225 as the first member extended in the vehicle width direction and the second bracket 226 as the second member extended in the vehicle front-rear direction from the tip end of the first bracket 225, and the foot rest 27 disposed on the upper side of the foot bracket 92.

The foot bracket 28 can be supported by the foot bracket 92 with a simple structure, whereby a reduction in the number of component parts and reductions in weight and cost can be contrived.

In addition, since the first bracket 225 and the second bracket 226 constituting the foot bracket 92 are simple in shape, productivity can be enhanced.

Further, since the foot board 28 is supported favorably by clamping it between the foot bracket 92 and the foot rest 27, it is unnecessary to use the reinforcing member, which can also contribute to reductions in weight and cost.

The present invention is sixthly characterized in that, as shown in FIGS. 4 and 5, in the above-mentioned configuration, preferably, the length L1 of the first bracket 225 of the foot bracket 92 and the length L2 of the second bracket 226 of the foot bracket 92 satisfy the relationship of $0.5L1<L2<L1$.

Since the length L1 of the first bracket 225 and the length L2 of the second bracket 226 satisfy the relationship of $0.5L1<L2<L1$, the foot bracket 92 is small in weight, and the foot board 28 is not liable to be deflected, so that a reduction in weight and good support of the foot board 28 can be simultaneously achieved.

The present invention is seventhly characterized in that, as has been described referring to FIG. 12, in the above-mentioned configuration, preferably, the foot rest 27 is mounted to the vehicle body frame 11 (see FIG. 1), specifically to the lower main frame 34, through the foot bracket 92 in a cantilever mode.

Since the foot rest 27 is supported in a cantilever mode, the support structure for the foot rest 27 can be more simplified, and a reduction in weight can be contrived.

In addition, where the weight of the foot rest 27 is equivalent to that in the related art, for example the outer shape of the foot bracket 92 can be enlarged, the area of the foot board 28 can also be enlarged, and the foot positions at the time of riding on and getting off the vehicle are broadened, so that it is easier to ride on and get off the vehicle. Further, the spaces near the driver's feet during driving are broadened, so that it is easy for the rider to assume an easy riding posture.

Incidentally, while the foot bracket has been composed of two members in the present invention, this configuration is not limitative; the foot bracket may be composed of a single member, for example, an L-shaped member or a member nearly L- or T-shaped.

As has been described referring to FIGS. 2, 14, and 17 above, the present invention is eighthly characterized in that, in the brake device for a saddle ride vehicle 10, including, on both lateral sides of the vehicle, foot boards 28 disposed between the front fender 22 and the rear fender 26, and foot rests 27 provided at upper portions of the foot boards 28, and the brake pedal 91 stepped in by a foot 233 mounted on the foot board 28 and the foot rest 27, the brake pedal 91 is disposed on the upper side relative to the foot board 28, the brake pedal 91 includes the arm portion 404 movable vertically, and the pedal portion 405 provided at a tip end portion of the arm portion 404 so as to be stepped in by the foot, and the arm portion 404 includes the bent portion 408 projectedly bent to the vehicle outside in plan view.

Since the brake pedal 91 is disposed on the upper side relative to the foot board 28, collision of stones against the brake pedal 91 and adhesion of mud or the like to the brake pedal 91 can be prevented.

In addition, since the arm portion 404 and the pedal portion 405 are provided and the arm portion 404 is provided with the bent portion 408 projectedly bent to the vehicle body outside in plan view, the pedal portion 405 is easy to step in, and erroneous stepping-in of the arm portion 404 can be obviated.

The present invention is ninthly characterized in that a tip end portion of the arm portion 404 and the pedal portion 405 are substantially flush with each other in side view.

Since the tip end portion of the arm portion 404 and the pedal portion 405 are substantially flush with each other in side view, the pedal portion 405 can be easily formed, and the cost can be reduced.

The present invention is tenthly characterized in that the arm portion 404 and the pedal portion 405 are integrally molded.

Since the arm portion 404 and the pedal portion 405 are integrally molded, the number of component parts can be reduced, and the cost can be reduced. Besides, the brake pedal 91 can be formed in a simple shape, and appearance quality can be enhanced.

The present invention is eleventhly characterized in that the side surface of the brake pedal 91 is located on the inner side of the inner end surface 27b of the foot rest 27 when the brake pedal 91 is stepped in.

Since the side surface 91a of the brake pedal 91 is located on the inner side of the inner end surface of the foot rest 27 when the brake pedal 91 is stepped in, the movable range of the brake pedal 91 can be set lower without largely bending the brake pedal 91, and the rider can step in the brake pedal 91 while assuming an easy posture.

The present invention is twelfthly characterized in that, of the foot board 28, the portion located on the lower side of the tip end of the brake pedal 91 is more sunken downwards than the other portions.

Since the portion, located on the lower side of the tip end of the brake pedal 91, of the foot board 28 is more sunken downwards than the other portions of the brake pedal 91, the movable range of the brake pedal 91 can be enlarged, and the degree of freedom in designing the brake device can be increased.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle ride vehicle with a front and a rear wheel, comprising:
    a front fender covering from an upper side to a rear side of the front wheel;
    a rear fender covering from a front side to an upper side of the rear wheel;
    right and left foot rests on which a rider places his feet;
    right and left foot boards disposed under the rider's feet for connecting the front fender and the rear fender to each other,
    right and left foot brackets corresponding to the right and left foot rests,
    wherein each of the foot boards is clamped between one of the foot rests and a corresponding one of the foot brackets, and
    further comprising right and left lower brackets fixed to a lower main frame,
    wherein each of the foot brackets is mounted to a corresponding one of the lower brackets at an angle θ against a horizontal line so that an outer side in a vehicle width direction is higher than an inner side in the vehicle width direction.

2. The saddle ride vehicle according to claim 1, wherein each of the foot boards is substantially U-shaped in side view, and includes:
    a front wall connected to the front fender;
    a bottom wall extending rearwardly from a lower end of the front wall;
    a rear wall extending substantially upwardly from a rear end of the bottom wall and connected to the rear fender; and
    a side plate provided on a depth side of a rear portion of the bottom wall and the rear wall.

3. The saddle ride vehicle according to claim 1, wherein each of the foot boards includes:
    a front wall connected to the front fender;
    a bottom wall extending rearwardly from a lower end of the front wall;
    a rear wall extending substantially upwardly from a rear end of the bottom wall and connected to the rear fender; and
    a side plate provided on a depth side of a rear portion of the bottom wall and the rear wall,
    wherein the front wall, the bottom wall, the rear wall, and the side plate are integrally molded, and
    wherein a lower end of the bottom wall and a rear end of the rear wall are set substantially along a lower main frame.

4. The saddle ride vehicle according to claim 1, wherein each of the foot boards includes raised portion which is integrally formed with the foot board so as to extend in a vehicle width direction.

5. The saddle ride vehicle according to claim 1, wherein each of the foot boards includes a plurality of opening portions for preventing stagnation of water or other elements on the foot board.

6. The saddle ride vehicle according to claim 1, wherein each of the foot boards, the corresponding foot bracket, and the corresponding foot rest are attached together by bolts to form a foot rest assembly.

7. The saddle ride vehicle according to claim 1, wherein each of the foot brackets includes:
    a first bracket extending in a vehicle width direction, and a second bracket mounted to a tip end of the first bracket orthogonally to the first bracket so as to extend in a vehicle front-rear direction.

8. The saddle ride vehicle according to claim 7, wherein L1 is a length of the first bracket, and L2 is a length of the second bracket, and wherein the lengths of the first and second brackets have a relationship of $0.5L1 < L2 < L1$.

9. The saddle ride vehicle according to claim 1, wherein each of the foot rests is mounted in a cantilever mode to a vehicle body frame through the corresponding foot bracket.

10. A saddle ride vehicle with front and rear wheels, comprising:
foot rests and foot boards, a rider placing his feet on the foot rests,
a foot bracket provided on each side of the vehicle,
the foot boards being disposed near the rider's feet and connecting front fenders and rear fenders to each other;
wherein each of the foot boards is supported clamped between a corresponding one of the foot rests and a corresponding one of the foot brackets, each of the foot brackets including a first member extending in a vehicle width direction and a second member extending from a tip end of the first member in a vehicle front-rear direction,
wherein each of the foot rests is disposed on an upper side of the corresponding foot bracket, and
wherein each of the foot brackets extends further in the vehicle width direction than the corresponding foot rest.

11. The saddle ride vehicle according to claim 10, wherein each of the foot boards is substantially U-shaped in side view, and includes:
a front wall connected to the corresponding front fender;
a bottom wall extending rearwardly from a lower end of the front wall;
a rear wall extending substantially upwardly from a rear end of the bottom wall and connected to the corresponding rear fender; and
a side plate provided on a depth side of a rear portion of the bottom wall and the rear wall.

12. The saddle ride vehicle according to claim 10, wherein each of the foot boards includes:
a front wall connected to the corresponding front fender;
a bottom wall extending rearwardly from a lower end of the front wall;
a rear wall extending substantially upwardly from a rear end of the bottom wall and connected to the corresponding rear fender; and
a side plate provided on a depth side of a rear portion of the bottom wall and the rear wall,
wherein the front wall, the bottom wall, the rear wall, and the side plate are integrally molded, and
wherein a lower end of the bottom wall and a rear end of the rear wall are set substantially along a lower main frame.

13. The saddle ride vehicle according to claim 10, wherein each of the foot boards includes a raised portion which is integrally formed with the foot board so as to extend in a vehicle width direction.

14. The saddle ride vehicle according to claim 10, wherein each of the foot boards includes a plurality of opening portions for preventing stagnation of water or other elements on the foot board.

15. The saddle ride vehicle according to claim 10, wherein each of the foot brackets is mounted to the corresponding lower bracket at an angle θ against a horizontal line so that an outer side in a vehicle width direction is higher than an inner side in the vehicle width direction,
wherein each of the foot boards is clamped between the corresponding foot bracket and the corresponding foot rest.

16. The saddle ride vehicle according to claim 10, wherein each of the foot boards, the corresponding foot bracket, and the corresponding foot rest are attached together by bolts to form a foot rest assembly.

17. The saddle ride vehicle according to claim 10, wherein L1 is a length of the first member, and L2 is a length of the second member, and wherein the lengths of the first and second members have a relationship of $0.5L1 < L2 < L1$.

18. The saddle ride vehicle according to claim 10, wherein each of the foot rests is mounted in a cantilever mode to a vehicle body frame through the corresponding foot bracket.

19. A vehicle with front and rear wheels, comprising:
right and left front fenders covering from upper sides to rear sides of the front wheels;
right and left rear fenders covering from front sides to upper sides of the rear wheels;
right and left foot rests on which a rider places his feet;
right and left foot boards disposed under the rider's feet for connecting the right front fender and the right rear fender to each other, and for connecting the left front fender and the left rear fender to each other,
right and left foot brackets corresponding to the right and left foot rests,
wherein the right foot board is clamped between the right foot rest and the right foot bracket to form a right foot rest assembly, and the left foot board is clamped between the left foot rest and the left foot bracket to form a left foot rest assembly, and
wherein each of the foot brackets extends further in a vehicle width direction than a corresponding one of the foot rests.

20. The saddle ride vehicle according to claim 19, further comprising right and left lower brackets fixed to a lower main frame,
wherein each of the foot brackets is mounted to a corresponding one of the lower brackets at an angle θ against a horizontal line so that an outer side in a vehicle width direction is higher than an inner side in the vehicle width direction.

* * * * *